United States Patent
Hatabu

(10) Patent No.: US 8,468,500 B2
(45) Date of Patent: Jun. 18, 2013

(54) PROGRAM DEBUGGING METHOD AND PROGRAM TRANSFORMATION METHOD, PROGRAM DEBUGGING DEVICE AND PROGRAM TRANSFORMATION DEVICE USING THE SAME, AND STORAGE MEDIUM

(75) Inventor: Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 439 days.

(21) Appl. No.: 12/735,039

(22) PCT Filed: Dec. 12, 2008

(86) PCT No.: PCT/JP2008/003738
§ 371 (c)(1),
(2), (4) Date: Jun. 11, 2010

(87) PCT Pub. No.: WO2009/075116
PCT Pub. Date: Jun. 18, 2009

(65) Prior Publication Data
US 2010/0257511 A1    Oct. 7, 2010

(30) Foreign Application Priority Data
Dec. 12, 2007    (JP) .................................. 2007-320278

(51) Int. Cl.
*G06F 9/44*    (2006.01)

(52) U.S. Cl.
USPC ............................ 717/124; 717/125; 717/127

(58) Field of Classification Search
None
See application file for complete search history.

(56) References Cited

U.S. PATENT DOCUMENTS

| 5,193,180 | A | 3/1993 | Hastings | |
|---|---|---|---|---|
| 7,150,006 | B2 * | 12/2006 | Bliss et al. | 717/124 |
| 7,669,189 | B1 * | 2/2010 | Umamageswaran | 717/127 |
| 7,849,446 | B2 * | 12/2010 | Lev et al. | 717/124 |

(Continued)

FOREIGN PATENT DOCUMENTS

| JP | 2001-142737 | 5/2001 |
|---|---|---|
| JP | 2003-99292 | 4/2003 |
| JP | 2006-11692 | 1/2006 |
| JP | 2007-199845 | 8/2007 |

OTHER PUBLICATIONS

Prvulovic et al., ReEnact: using thread-level speculation mechanisms to debug data races in multithreaded codes, May 2003, 12 pages, <http://delivery.acm.org/10.1145/860000/859632/p110-prvulovic.pdf>.*

(Continued)

*Primary Examiner* — Thuy Dao
(74) *Attorney, Agent, or Firm* — McGinn IP Law Group, PLLC

(57) ABSTRACT

A program debugging method of debugging a memory access to memory areas during an execution of a program includes changing only addresses allocated to segments among addresses of the memory areas to change an arrangement of the segments, executing the program in which the arrangement of the segments is changed, tracing memory accesses involved in the execution of the program to obtain reference addresses referred to by the memory access, and obtaining at least one of execution results, and analyzing the reference addresses of a memory access to be analyzed according to an execution command, which includes an analysis target, and determining whether the memory access to be analyzed is valid, when it is determined that at least one of the plurality of execution results, the numbers of accesses, and the execution orders are the same in all executions in the analyzing of the execution result.

20 Claims, 14 Drawing Sheets

U.S. PATENT DOCUMENTS

| | | | |
|---|---|---|---|
| 8,316,352 B2* | 11/2012 | Lev et al. | 717/124 |
| 2002/0188929 A1* | 12/2002 | Cyran et al. | 717/125 |
| 2006/0150006 A1* | 7/2006 | Mizutani | 714/11 |
| 2008/0288923 A1* | 11/2008 | Shimogori | 717/125 |
| 2009/0031289 A1* | 1/2009 | Michael | 717/124 |

OTHER PUBLICATIONS

Sezer et al., Memsherlock: an automated debugger for unknown memory corruption vulnerabilities, Oct. 2007, 11 pages, <http://delivery.acm.org/10.1145/1320000/1315314/p562-sezer.pdf>.*

Austin et al., Efficient Detection of All Pointer and Array Access Errors, Computer Sciences Dept., Univ. of Wisconsin-Madision, pp. 1-29, 1993.

Yutaka Oiwa, Tatsurou Sekiguchi, Eijiro Sumii, Akinori Yonezawa, "Fail-Safe ANSI-C Compiler: An Approach to Making C Programs Secure," In Lecture Notes in Computer Science vol. 2609, pp. 337-342, 2003.

N. Nethercote and J. Seward, "Valgrind: A Framework for Heavyweight Dynamic Binary Instrumentation," Proceedings of PLDI 2007, San Diego, California, USA, Jun. 2007.

R. Hastings and B. Joyce, "Purify: Fast detection of memory leaks and access errors," in Proceedings of the Winter USENIX Conference, pp. 125-136, 1992.

N. Nethercote and J. Fitzhardinge, "Bounds-Checking Entire Programs without Recompiling," In Informal Proceedings of SPACE 2004, 2004.

* cited by examiner

FIG. 4
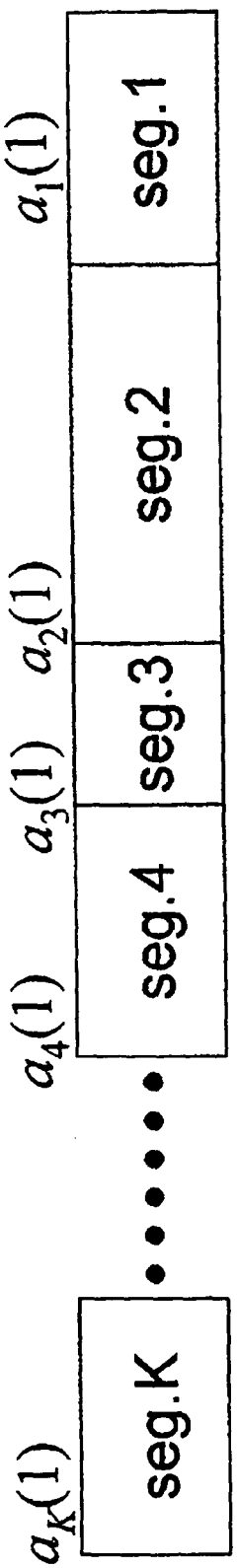
1. segment placement in first simulation
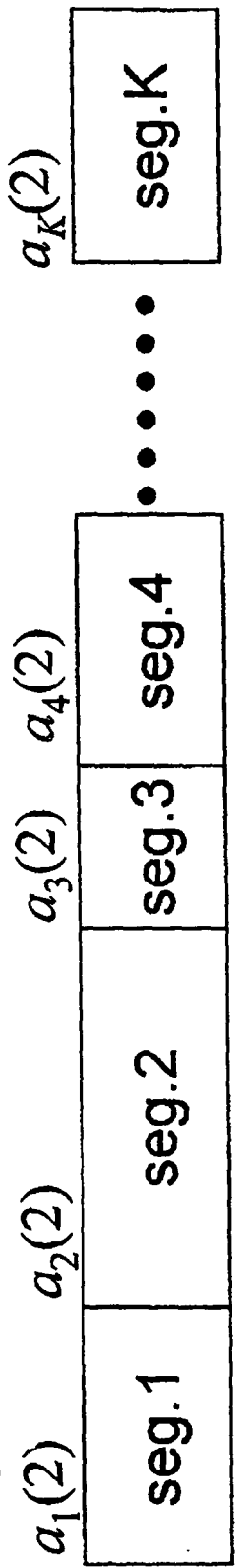
2. segment placement in second simulation

FIG. 7

```
 1|/* example of stack segment access */
 2|
 3|int func1(char *p, int x)
 4|{
 5|    int res;
 6|    res=0;
 7|    *(p-16)=1;
 8|    ...; /* some kind of calculation */
 9|    return res;
10|}
11|
12|int func2(int a, int b)
13|{
14|    char buf[8];
15|    return func1(buf, a+b);
16|}
17|
18|/* --end-- */
```

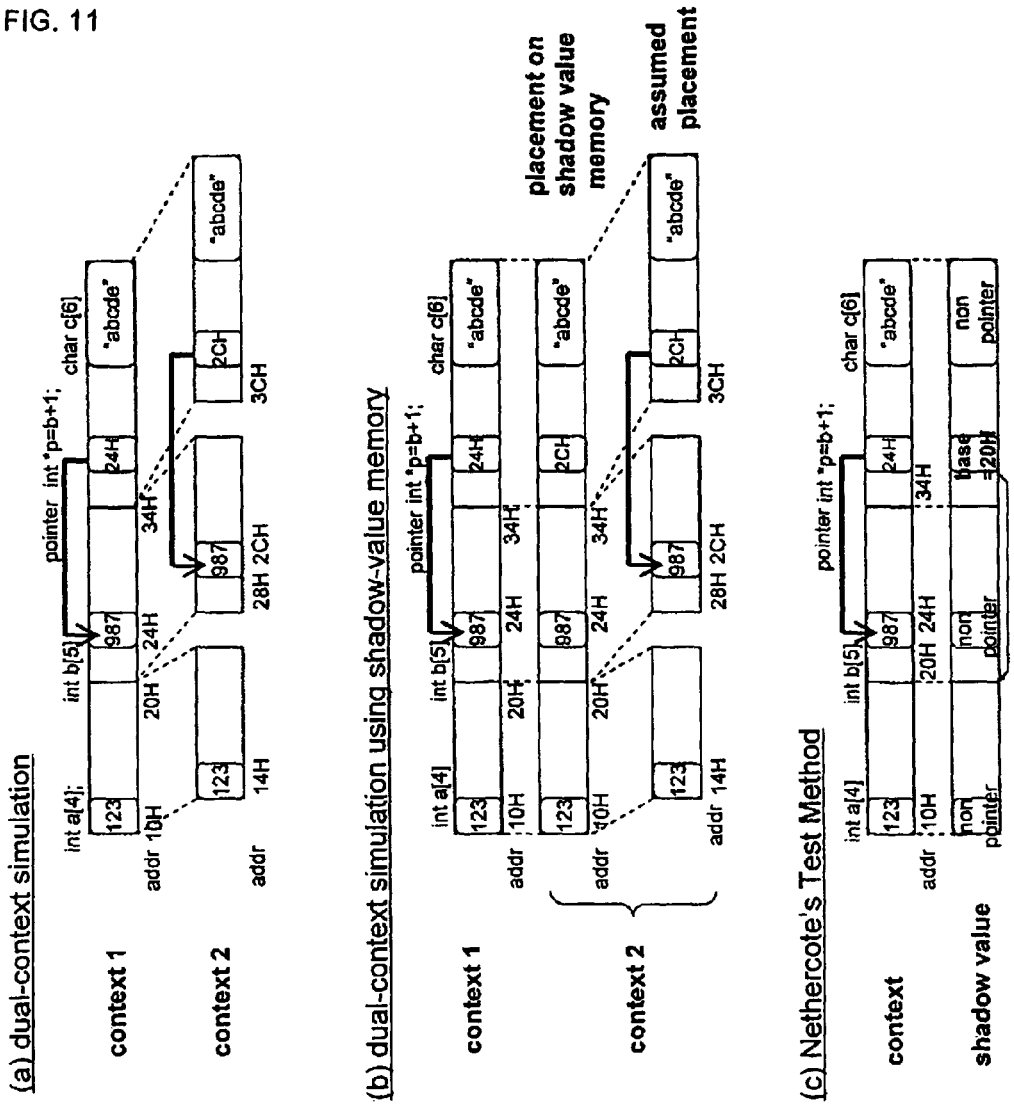

FIG. 12

| | ANSI C | FatPointer /FatInteger | proposed representation |
|---|---|---|---|
| pointer to ObjType type | ObjType *ptr; | ```
class FatPtr<ObjType>
{
    ObjType *base;
    int offset;
} ptr;
``` | ```
class DualPtr<ObjType>
{
    ObjType *value;
    ObjType *shadow_value;
} ptr;
``` |
| integer holding pointer value | ValType i; | ```
class FatInt<ValType>
{
    ValType value;
    void *base;
} i;
``` | ```
class Dual<ValType>
{
    ValType value;
    ValType shadow_value;
} i;
``` |

FIG. 13

```
1  /* test program, C language */
2
3  /* func1: continuous access */
4  void func1(char *p)
5  {
6      int i;
7      for (i=0; i<=8; ++i)
8      {
9          *(p+i)=0;
10     }
11 }
12
13 /* func2: non-continuous access */
14 void func2(char *p)
15 {
16     *(p+12)=0;
17 }
18
19 /* func3: difference of pointers */
20 void func3(char *p, int diff)
21 {
22     char *q=p+diff;
23     *q=0;
24 }
25
26 /* func4: logcal operation */
27 void func4(unsigned int p, unsigned int q)
28 {
29     p=p^q;  /*  p=p XOR q */
30     q=p^q;  /*  p=p XOR q */
31     p=p^q;  /*  p=p XOR q */
32     *(char*)p=0;
33     *(char*)q=1;
34 }
35
36 /* global variables (static segments placed by linker) */
37 char seg1[8];  /* segment 1 */
38 char seg2[8];  /* segment 2 */
39
40 /* test function */
41 int main()
42 {
43     func1(seg1);
44     func2(seg1);
45     func3(seg1, seg2-seg1);
46     func4((unsigned int)seg1, (unsigned int)seg2);
47 }
48
49 /* —end— */
```

PROGRAM DEBUGGING METHOD AND PROGRAM TRANSFORMATION METHOD, PROGRAM DEBUGGING DEVICE AND PROGRAM TRANSFORMATION DEVICE USING THE SAME, AND STORAGE MEDIUM

TECHNICAL FIELD

The present invention relates to a program debugging method and a program transformation method, a program debugging device and a program transformation device using the same, and a storage medium storing the program, and more particularly, to a method and device for debugging a memory access in a computer program.

BACKGROUND ART

In the program debugging method, a so-called boundary test that checks whether an access address or access timing is included in the effective range of a memory segment allocated with the address at that time is performed on a memory access when a computer program is executed, thereby detecting an invalid access beyond the range.

In a process of developing various kinds of computer programs for a PC (Personal Computer), a workstation, and an embedded apparatus, a test process of testing whether a created program is operated as required, without any problem or a debugging process of identifying causes of detected errors and performing necessary correction of the errors has been known. These processes are important to improve the reliability of an apparatus or a system that is operated by the program.

A boundary test of a memory access is one of the tests performed in the test process or the debugging process. The boundary test determines whether the reference address of a memory access obtained by the execution of the program indicates a valid memory area that is allocated for executing the program at that time.

In various kinds of programming languages, such as the C language and the C++ language, it is possible to use a pointer-type variable. The pointer variable can hold an arbitrary address value, regardless of whether valid data is arranged in a reference destination. Therefore, when a program including an erroneous execution command is described, a memory access is performed beyond an allowed range. In this case, serious programs are likely to arise in the apparatus or the system. The boundary test removes an invalid memory access beyond an unintended range from the program.

There are various kinds of boundary tests. One of them operates a program to be tested on an actual environment or a virtual execution environment, traces a memory access occurring at that time, and checks consistence with a memory allocation state. In this boundary test, for example, a processor or hardware having a function of monitoring a memory access signal, debugging software, and a simulator for simulating the operation of the processor are used to execute the program while monitoring the memory access. Alternatively, in some cases, an interpreter that directly analyzes execution commands described in the C language is used to execute the program.

Another boundary test transforms a program to be tested while analyzing it to generate another program that performs the original process to be performed by the program to be tested and a memory access boundary test, and executes the generated program in an appropriate environment. The program transformation type is a source code level test type that is performed on a program in which execution commands are described in the C language or the C++ language or a binary level type that transforms an executable program having debugging information added thereto while analyzing a machine language included in the program as the execution command.

An example of the former type is Non-patent Document 1 or Fail Safe C (Non-patent Document 2) (However, this is a technique whose main purpose is not a test, but which is for generating a safe program that is not erroneously operated during execution). An example of the latter type is Valgrind (Non-patent Document 3) or Purify (Non-patent Document 4). Patent Document 1 relates to a program transformation technique that is applied to the latter type.

In the Valgrind or Purify, a simulator with a function of monitoring various kinds of states or a test function executes an executable program to be tested and creates a program that virtually performs a process equivalent to the test process. In the virtual simulator, it is possible to store auxiliary information for test in each value stored in the memory, which is used during execution, or a register of a CPU (central processing unit). In Non-patent Document 2 (Valgrind), this information is called a shadow value.

The present invention provides a method of determining whether each memory access traced during a program test is a valid access matched with memory allocation or an invalid access, as one of the techniques used in various kinds of boundary tests for the memory access. Techniques related to the present invention will be described below from this viewpoint.

Before description, terms are defined. A program is a continuous memory area in which an access is allowed, and a unit giving the boundary of the determination of an invalid address in the boundary test is called a memory segment or a segment.

The segments include (1) a heap segment that is dynamically arranged on a heap memory and is dynamically deallocated, (2) a static segment whose arrangement is determined when execution codes of the program are generated or when the execution of the program starts, and (3) a stack segment that is arranged on a stack memory and is accessed by a relative address reference based on a stack pointer which is dynamically given when a function is called.

In the boundary test, the reference address of the memory access traced during the execution of the program is calculated intending the reference of one of the memory segments that can be used at that time, and it is determined that the access is valid only when the address is within the effective range of the intended segment. The intention of the segment reference is determined based on whether the address of an access destination is calculated using the beginning address allocated to the segment.

A program of this determination is a method of specifying an address used as a base for calculating the address, when the test is performed. The pointer variable includes only an address value, but does not include the address used as a base for calculating the address or information related to a segment that is desired to be referred to. When it is difficult to specify the address used as the base, it is difficult to know an offset value added to the address and it is difficult to determine whether the range is valid.

<Guard Zone Type>

A guard zone type is a boundary test method in which an access prohibited area, which is called a guard zone, is provided before and after each of the ensured segments, a program is executed while acquiring the trace of a memory access, and when an access to the guard zone occurs, the access is determined to be invalid.

The guard zone type is used by many program debugging tools. For example, a memcheck tool of the Valgrind or the Purify has a function of performing the boundary test based on the guard zone type.

An example of a boundary test process using the guard zone type will be described. FIG. 13 is a diagram illustrating a C language program to be tested. The program declares the use of two char-type arrangements in a 37th row and a 38th row, and in this test, two static segments seg1 and seg2 having two arrangements stored therein are units of the boundary test.

FIG. 14 shows an example of the arrangement of the two segments seg1 and seg2 in an address space in the guard zone type. In FIG. 14, the address increases in the right direction. The segments seg1 and seg2 are arranged in this order using an appropriate address as a base. Each of the segments seg1 and seg2 can store eight char-type variables. The guard zones for detecting an invalid access are arranged before the segment seg1, between the segment seg1 and the segment seg2, and after the segment seg2. The size of one guard zone is 1 byte.

When the C language program shown in FIG. 13 starts to be executed, main functions in 41st to 47th rows are executed at the beginning, and four functions among them are sequentially called. An execution command to call a function func1 and a function func2 in a 43rd row and a 44th row is an example of causing an invalid memory access to be detected by the boundary test.

As a pattern that is frequently generated by a process using a pointer, there is an access to a continuous memory area by a repeated process. The function func1 in the 4th to 11th rows in FIG. 13 is an example of the access to the continuous memory area, and a process of writing 0 to nine char-type integers that are continuously arranged at the address indicated by an argument p. However, in the call of the function func1 in the 43rd row, since a pointer to the segment seg1 that includes only eight elements, which is an error, is set as the argument, an invalid memory access occurs.

When this program is executed with the segments arranged as shown in FIG. 14, the function func1 acquires a pointer p indicating the beginning address of the static segment seg1 as an argument and writes 0 in nine continuous char variables. When a variable i is 8, an area referred to by an access by a pointer in the 9th row is set as the guard zone. Therefore, it is determined that an invalid memory access is detected at that time, and the execution of the program stops. As such, the guard zone type is effective in detecting the error of a program description when a continuous memory access is performed.

The guard zone type has a problem in that it is difficult to detect a discontinuous invalid memory access. For example, the call of the function func2 in a 44th row of the program shown in FIG. 13 is an example of an execution command causing a memory access that cannot be detected by the guard zone type, even though the access is invalid.

The function func2 shown in FIG. 13 sets 0 to a 13th element of the segment indicated by the pointer of the argument, and designates an inappropriate segment seg1 including only eight elements in the 44th row. When this is executed in the memory arrangement shown in FIG. 14, a process in a 16th row generates an invalid memory access beyond the range of the segment seg1. As a result, the segment seg2 is broken. However, since this access refers to a memory other than the guard zone, it is difficult to detect this error.

In the program debugging process, when it is difficult to instantaneously detect the destruction of data due to an access beyond the range, it takes a long time to specify the cause of the error. In the program test process, when an access beyond the range does not cause an error fortunately under the operation conditions during a test, the test is ineffective in detecting the problems of the program. This accidental factor includes the arrangement address of the segment or the order in which the segments are arranged.

For example, when the boundary test is performed on a program described in the C language, there is a possibility that the error will not be detected fortunately depending on the order in which the segments are arranged by a compile tool. As such, the guard zone type has a problem in that it probabilistically detects a continuous access beyond the range.

<FAT Pointer Type>

A FAT pointer (or a safe pointer) is an extension pointer that increases the amount of information in a pointer variable and includes identification information of a reference segment in addition to a reference address value. A method of defining the pointer variable using the FAT pointer and dynamically performs the boundary test of an address value before a memory access is performed during the execution of the program is called a FAT pointer type. For example, Non-patent Document 1 or Non-patent Document 2 disclose a technique which transforms a C language program that is described with a general pointer variable without the FAT pointer into a program that dynamically performs a test using the FAT pointer.

The FAT pointer type can detect an invalid discontinuous access, unlike the guard zone type. For example, in the call of the function func2 of the program shown in FIG. 13, since a FAT pointer p of the argument includes information indicating the segment seg1 used as a base, a valid test can be performed inside the called function. In this example, before a memory access in a 16th row is performed, it is tested whether a pointer (p+12) indicates beyond the valid range of the segment seg1. Since the address value is out of the end of the segment seg1, it is detected that the memory access is invalid.

Generally, the FAT pointer type tests the program described with a programming language, such as the C language, but cannot be applied to an executable program. However, Nethercote et al. have developed a test technique that performs the boundary test of the FAT pointer type on an executable program using a virtual execution environment with a shadow value included in, for example, a Valgrind test tool (Non-patent Document 5).

The technique disclosed in Non-patent Document 5 stores a flag indicating a non-pointer type or a pointer type and an identifier of a segment used as a base when the flag indicates the pointer type as shadow values in each value stored in the memory during the execution of the program and each register, and updates the shadow values while tracing the execution of the program. For example, when a function for ensuring the memory is called from the heap, a flag indicating a pointer and the address of a base segment are stored in the shadow value of a return value. When this variable is copied to a variable disposed at another address, type information is also copied. Even when a pointer operation of adding or subtracting an integer to or from the pointer is performed, the trace of appropriate type information is performed.

The technique disclosed in Non-patent Document 5 differs from the general FAT pointer type in that the type of the value stored in the memory (a pointer type or a non-pointer type) is determined from an executed machine language command, without depending on a language description. However, the technique disclosed Non-patent Document 5 can be analyzed to belong to the range of the FAT pointer type in that the base segment is associatively stored in each value and is traced.

The boundary test method based on the FAT pointer type has a problem in that it does not respond to subtraction between the pointers referring to different segments, four arithmetic operations or logical operations that are performed regarding the pointer variable as an address value, and the division of an address into the most significant bytes and the least significant bytes (Chapter 2.5 in Non-patent Document 5).

In the C language, such a description depends on a processing system, but is not a valid program that is operated in all of the C compilers or the execution environments. However, the description is allowed in many environments and performs a predetermined operation. Therefore, there are many programs including the description. In addition, there is a program in which an equivalent address arithmetic process is not included in a language description, but is included in a generated machine language command.

The call of a function func3 in a 45th row of the program shown in FIG. 13 is an example of the subtraction of a pointer. The function func3 writes an int integer 0 in a memory indicated by a pointer obtained by adding an offset diff to a pointer p. The 45th row sets the beginning address of the segment seg1 to p and passes the difference diff between the beginning address of the segment seg2 and the beginning address of the segment seg1.

Here, the difference between the segment seg2 and the segment seg1 is the difference between the pointers indicating different segments. Therefore, the difference is a description that is not allowed in the C language standard. However, many C language compilers are operated such that the segment seg2 the segment seg1 returns the difference between the addresses of the segment seg2 and the segment seg1 and p+diff calculated in the function func3 indicates the head of the segment seg2.

When the boundary test based on the FAT pointer is performed on it, a 22nd row is an operation of adding an integer value to the pointer p of the argument. Therefore, a pointer q is analyzed as a pointer that refers to the same segment seg1 as the pointer p. However, actually, since the pointer q indicates the head of the segment seg2 and refers to beyond the range of the segment seg1, an access in a 23rd row is determined to be invalid by the test during execution.

The call of a function func4 in a 46th row of the program shown in FIG. 13 is an example of the conversion of a type to an integer and a logical operation. The function func4 acquires the address of the memory accessed in 32nd and 33rd rows as an 'unsigned int'-type integer, not a pointer variable. In a compiler environment in which the address value can be represented by an 'unsigned int' type, the type conversion between the pointer and the 'unsigned int' is allowed, which depends on a processing system.

The function func4 writes 0 in a char variable indicated by the address p (32nd row), performs an exclusive OR (XOR) operation three times to convert the variables p and q (29th to 31st rows), and outputs 1 to a char variable indicated by an address q (33rd row).

As such, it is difficult to simply apply the FAT pointer type to the program including the subtraction of pointers between different segments or the type conversion of the pointer into an integer. According to the program including only simple type conversion, it is possible to perform the test using the Fail Safe C or the method investigated by Nethercote et al. (the Fail Safe C is a FAT integer type that traces and stores the base segment in a converted integer variable, and the method investigated by Nethercote et al. traces the base segment without using a language description), but it is difficult to respond to an arbitrary operation.

For example, in a 30th row of the program shown in FIG. 13, it is substantially difficult to associate one segment with the logical operation result of an address value. Therefore, it is difficult to perform a valid boundary test after the 30th row. As such, the FAT pointer type in which base segment information is included in the pointer variable has a problem in that it restricts the description of a program that can be tested.

[Patent Document 1] U.S. Pat. No. 5,193,180
[Non-patent Document 1] Austin et al., Efficient Detection of All Pointer and Array Access Errors, Computer Sciences Dept., Univ. of Wisconsin-Madision, pp. 1-29, 1993.
[Non-patent Document 2] Yutaka Oiwa, Tatsurou Sekiguchi, Eijiro Sumii, Akinori Yonezawa, "Fail-Safe ANSI-C Compiler: An Approach to Making C Programs Secure," In Lecture Notes in Computer Science Vol. 2609, pp. 337-342, 2003.
[Non-patent Document 3] N. Nethercote and J. Seward, "Valgrind: A Framework for Heavyweight Dynamic Binary Instrumentation," Proceedings of PLDI 2007, San Diego, Calif., USA, June 2007.
[Non-patent Document 4] R. Hastings and B. Joyce, "Purify: Fast detection of memory leaks and access errors," in Proceedings of the Winter USENIX Conference, pp. 125-136, 1992.
[Non-patent Document 5] N. Nethercote and J. Fitzhardinge, "Bounds-Checking Entire Programs without Recompiling," In Informal Proceedings of SPACE 2004, 2004.

DISCLOSURE OF THE INVENTION

As described above, in the technique related to the present invention, the guard zone type according to the related art is used as a so-called boundary test method that determines whether the address of a memory access performed when a program is executed indicates a valid memory area in the segment.

However, the technique related to the present invention has a problem in that it can detect only an invalid access in the vicinity of the boundary between the segments and can only probabilistically detect a discontinuous access beyond the range. The program causes a delay in the specification of the cause of a program debugging error and a reduction in the validity of the test.

As a method of solving the above-mentioned problems, a method using the FAT pointer has been proposed which traces the one-to-one correspondence between an address value and a reference segment. Therefore, it is difficult for the method to correspond to an arbitrary operation performed on the address value, and the method limits programs to be tested.

An object of the present invention is to provide a method or device for performing a segment boundary test of a memory access that is capable of performing debugging with high efficiency, reliably performing the test, and being applied to programs in a wide range.

Specifically, an object of the present invention is to provide a boundary test method or device capable of reliably and instantaneously detecting an invalid access referring to beyond a valid segment range, without depending on the arrangement of segments or execution conditions.

Alternatively, an object of the present invention is to provide a method or device that performs a boundary test on a program which performs an arbitrary operation, such as a logical operation, on an address value referring to a segment.

That is, an object of the present invention is to provide a program debugging method and a program transformation method capable of solving the above-mentioned problems and reliably testing the consistence of the address of a memory access performed during the execution of a program, a program debugging device and a program transformation device using the same, and a storage medium storing the program.

According to the present invention, there is provided a program debugging method of debugging a memory access to memory areas which are ensured and used in the unit of segments during the execution of a program. The method includes: changing only addresses allocated to the segments among the addresses of the memory areas to change the arrangement of the segments; executing the program in which the arrangement of the segments is changed, tracing memory accesses involved in the execution of the program to obtain reference addresses referred to by the memory access, and obtaining at least one of execution results indicating the execution results of the program, the numbers of accesses indicating the numbers of times the memory access is performed, and execution orders indicating the orders in which a plurality of execution commands included in the program is executed; analyzing the execution results to determine whether at least one of a plurality of execution results obtained by performing the allocating of the addresses and the executing of the program plural times, the numbers of accesses, and the execution orders are the same in all executions; and analyzing the reference addresses of a memory access to be analyzed according to an execution command, which is an analysis target, among a plurality of execution commands and determining whether the memory access to be analyzed is valid, when it is determined that at least one of the plurality of execution results, the numbers of accesses, and the execution orders are the same in all executions in the analyzing of the execution result.

According to the present invention, there is provided a program transformation method of transforming a program executed by a first information processing apparatus into a debugging program that allows a second information processing apparatus to perform a process of testing a memory access to memory areas which are ensured and used in the unit of segments when the program is executed by the first information processing apparatus. The debugging program allows the second information processing apparatus to perform: an address allocating process of changing only addresses allocated to the segments among the addresses of the memory areas to change the arrangement of the segments; a program executing process of executing the program in which the arrangement of the segments is changed, tracing the memory access involved in the execution of the program to obtain reference addresses referred to by the memory access, and obtaining at least one of execution results indicating the execution result of the program, the numbers of accesses indicating the numbers of times the memory access is performed, and execution orders indicating the orders in which a plurality of execution commands included in the program is executed; an execution result analyzing process of determining whether at least one of a plurality of execution results obtained by performing the address allocating process and the program executing process plural times, the numbers of accesses, and the execution orders are the same in all executions; and a memory access analyzing process of analyzing the reference addresses of a memory access to be analyzed according to an execution command, which is an analysis target, among a plurality of execution commands and determining whether the memory access to be analyzed is valid, when it is determined that at least one of the plurality of execution results, the numbers of accesses, and the execution orders are the same in all executions in the execution result analyzing process.

According to the present invention, there is provided a program debugging device for debugging a memory access to memory areas which are ensured and used in the unit of segments during the execution of a program. The program debugging device includes: an address allocating unit that changes only addresses allocated to the segments among the addresses of the memory areas to change the arrangement of the segments; a program executing unit that executes the program in which the arrangement of the segments is changed, traces the memory access involved in the execution of the program to obtain reference addresses referred to by the memory access, and obtains at least one of execution results indicating the execution results of the program, the numbers of accesses indicating the numbers of times the memory access is performed, and execution orders indicating the orders in which a plurality of execution commands included in the program is executed; an execution result analyzing unit that determines whether at least one of a plurality of execution results obtained by performing the program plural times using the address allocating unit and the program executing unit, the numbers of accesses, and the execution orders are the same in all executions; and a memory access analyzing unit that analyzes the reference addresses of a memory access to be analyzed according to an execution command, which is an analysis target, among a plurality of execution commands and determines whether the memory access to be analyzed is valid, when the execution result analyzing unit determines that at least one of the plurality of execution results, the numbers of accesses, and the execution orders are the same in all executions.

According to the present invention, there is provided a program transformation device that transforms a program executed by a first information processing apparatus into a debugging program that allows a second information processing apparatus to perform a process of testing a memory access to memory areas which are ensured and used in the unit of segments when the program is executed by the first information processing apparatus. The debugging program allows the second information processing apparatus to perform: an address allocating process of changing only addresses allocated to the segments among the addresses of the memory areas to change the arrangement of the segments; a program executing process of executing the program in which the arrangement of the segments is changed, tracing the memory access involved in the execution of the program to obtain reference addresses referred to by the memory access, and obtaining at least one of execution results indicating the execution results of the program, the numbers of accesses indicating the numbers of times the memory access is performed, and execution orders indicating the orders in which a plurality of execution commands included in the program is executed; an execution result analyzing process of determining whether at least one of a plurality of execution results obtained by performing the address allocating process and the program executing process plural times, the numbers of accesses, and the execution orders are the same in all executions; and a memory access analyzing process of analyzing the reference addresses of a memory access to be analyzed according to an execution command, which is an analysis target, among a plurality of execution commands and determining whether the memory access to be analyzed is valid, when it is determined that at least one of the plurality of execution results, the numbers of accesses, and the execution orders are the same in all executions in the execution result analyzing process.

According to the present invention, there is provided a computer-readable storage medium that stores a debugging program for debugging a memory access to memory areas which are ensured and used in the unit of segments during the execution of a program. The debugging program allows a computer to perform: an address allocating process of changing only addresses allocated to the segments among the addresses of the memory areas to change the arrangement of the segments; a program executing process of executing the program in which the arrangement of the segments is changed, tracing the memory access involved in the execution of the program to obtain reference addresses referred to by the memory access, and obtaining at least one of execution results indicating the execution results of the program, the numbers of accesses indicating the numbers of times the memory access is performed, and execution orders indicating the orders in which a plurality of execution commands included in the program is executed; an execution result analyzing process of determining whether at least one of a plurality of execution results obtained by performing the program plural times using the address allocating process and the program executing process, the number of accesses, and the execution orders are the same in all executions; and a memory access analyzing process of analyzing the reference address of a memory access to be analyzed according to an execution command, which is an analysis target, among a plurality of execution commands and determining whether the memory access to be analyzed is valid, when it is determined that at least one of the plurality of execution results, the numbers of accesses, and the execution orders are the same in all executions in the execution result analyzing process.

According to the present invention, there is provided a storage medium that stores a debugging program which allows a second information processing apparatus to perform a process of testing a memory access to memory areas which are ensured and used in the unit of segments when a first information processing apparatus executes a program. The debugging program allows the second information processing apparatus to perform: an address allocating process of changing addresses allocated to the segments among the addresses of the memory areas to change the arrangement of the segments; a program executing process of executing the program in which the arrangement of the segments is changed, tracing the memory access involved in the execution of the program to obtain reference addresses referred to by the memory access, and obtaining at least one of execution results indicating the execution results of the program, the numbers of accesses indicating the numbers of times the memory access is performed, and execution orders indicating the orders in which a plurality of execution commands included in the program is executed; an execution result analyzing process of determining whether at least one of a plurality of execution results obtained by performing the address allocating process and the program executing process plural times, the number of accesses, and the execution orders are the same in all executions; and a memory access analyzing process of analyzing the reference addresses of a memory access to be analyzed according to an execution command, which is an analysis target, among a plurality of execution commands and determining whether the memory access to be analyzed is valid, when it is determined that at least one of the plurality of execution results, the numbers of accesses, and the execution orders are the same in all executions in the execution result analyzing process.

As described above, the present invention changes only the arrangement of the segments, executes a program to be tested plural times while maintaining the other execution elements, traces each memory access performed during the execution of the program to obtain a plurality of reference addresses and other execution results, determines whether other execution results are not changed, and performs an analysis process based on the reference address of a memory access performed according to an execution command to be analyzed. Therefore, it is possible to reliably detect an invalid memory access without depending on the arrangement of the segments or execution conditions.

BRIEF DESCRIPTION OF THE DRAWINGS

The above and other objects, advantages, and features of the present invention will be more apparent from the following description of certain preferred embodiments taken in conjunction with the accompanying drawings.

FIG. 4 is a diagram illustrating another example of the method of arranging the memory segments according to the present invention.

FIG. 7 is a diagram illustrating an example of a C language program for describing the operation of a program debugging device according to a sixth embodiment of the present invention.

FIG. 11 is a diagram illustrating the difference between the eighth embodiment and a ninth embodiment of the present invention and a method related to the present invention.

FIG. 12 is a diagram illustrating a characteristic portion of the conversion of a program description according to a tenth embodiment.

FIG. 13 is a diagram illustrating an example of a C language program for describing the problems of a memory access boundary test method related to the present invention.

BEST MODE FOR CARRYING OUT THE INVENTION

Figure 1:
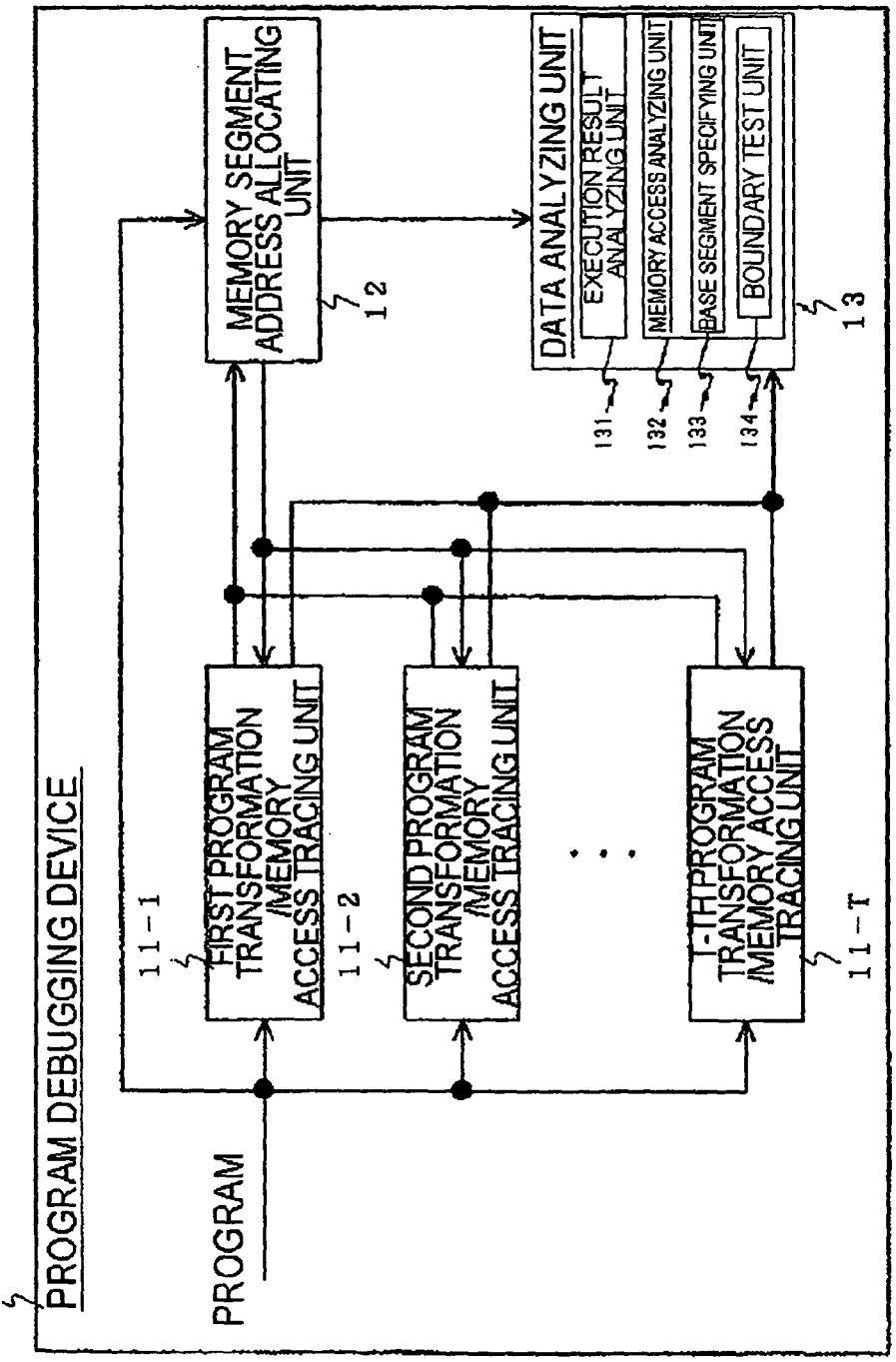
FIG. 1 is a block diagram illustrating an example of the structure of a program debugging device according to a first embodiment of the present invention.

Hereinafter, exemplary embodiments of the present invention will be described with reference to the accompanying drawings. FIG. 1 is a block diagram illustrating an example of the structure of a program debugging device according to a first embodiment of the present invention. FIG. 1 shows an example of the structure of a unit for obtaining T address values in the program debugging device according to the first embodiment of the present invention. The program debugging device may be provided in, for example, an information processing apparatus that creates or transforms programs, or an information processing apparatus that executes a program to perform various processes.

In FIG. 1, a program debugging device 1 according to the first embodiment of the present invention includes a first program transformation/memory access tracing unit 11-1, a second program transformation/memory access tracing unit 11-2, ..., a T-th program transformation/memory access tracing unit 11-T (hereinafter, referred to as memory access tracing units 11-1 to 11-T), a memory segment address allocating unit (hereinafter, referred to as an address allocating unit) 12, and a data analyzing unit 13. The structure shown in FIG. 1 is just an illustrative example, and any other structures may be used as long as they can obtain a plurality of address values.

The program debugging device 1 according to this embodiment can debug a memory access to memory areas that are ensured and used in the unit of segments when a program is executed. In particular, the program debugging device 1 can analyze a memory access involved in the execution of the program and perform boundary determination.

The memory area storing programs may be an external storage device connected to the program debugging device 1 or a storage device provided in the program debugging device 1.

The address allocating unit 12 can change only the addresses allocated with the segments among the addresses of the memory area and change the arrangement of the segments.

The memory access tracing units 11-1 to 11-T can execute the program in which the arrangement of the segments is changed by the address allocating unit 12, trace a memory access involved in the execution of the program, and obtain a reference address that is referred to by the memory access. In addition, the memory access tracing units 11-1 to 11-T can obtain at least one of an execution result indicating the execution result of the program, the number of accesses indicating the number of times the memory access is performed, and an execution order indicating the order in which a plurality of execution commands included in the program is executed.

The data analyzing unit 13 may include an execution result analyzing unit 131 that determines whether at least one of a plurality of execution results obtained when the program is executed plural times by the address allocating unit 12 and the memory access tracing units 11-1 to 11-T, the number of accesses, and the execution order is the same in all of the executions and a memory access analyzing unit 132 that analyzes the reference address of a memory access to be analyzed according to an execution command, which is an analysis target, among a plurality of execution commands and determines whether the memory access to be analyzed is invalid, when the execution result analyzing unit 131 determines that at least one of the execution results, the number of accesses, and the execution order is the same in all of the executions.

As described above, it is necessary to specify a segment, which is a base for calculating the address of an access destination, for each memory access in order to reliably determine the boundary of the memory access that is discontinuously performed. However, in the system using a FAT pointer, there are restrictions in the description of an execution command in the program. Therefore, this embodiment specifies a base segment on a principle different from that in the system using the FAT pointer.

Figure 2:
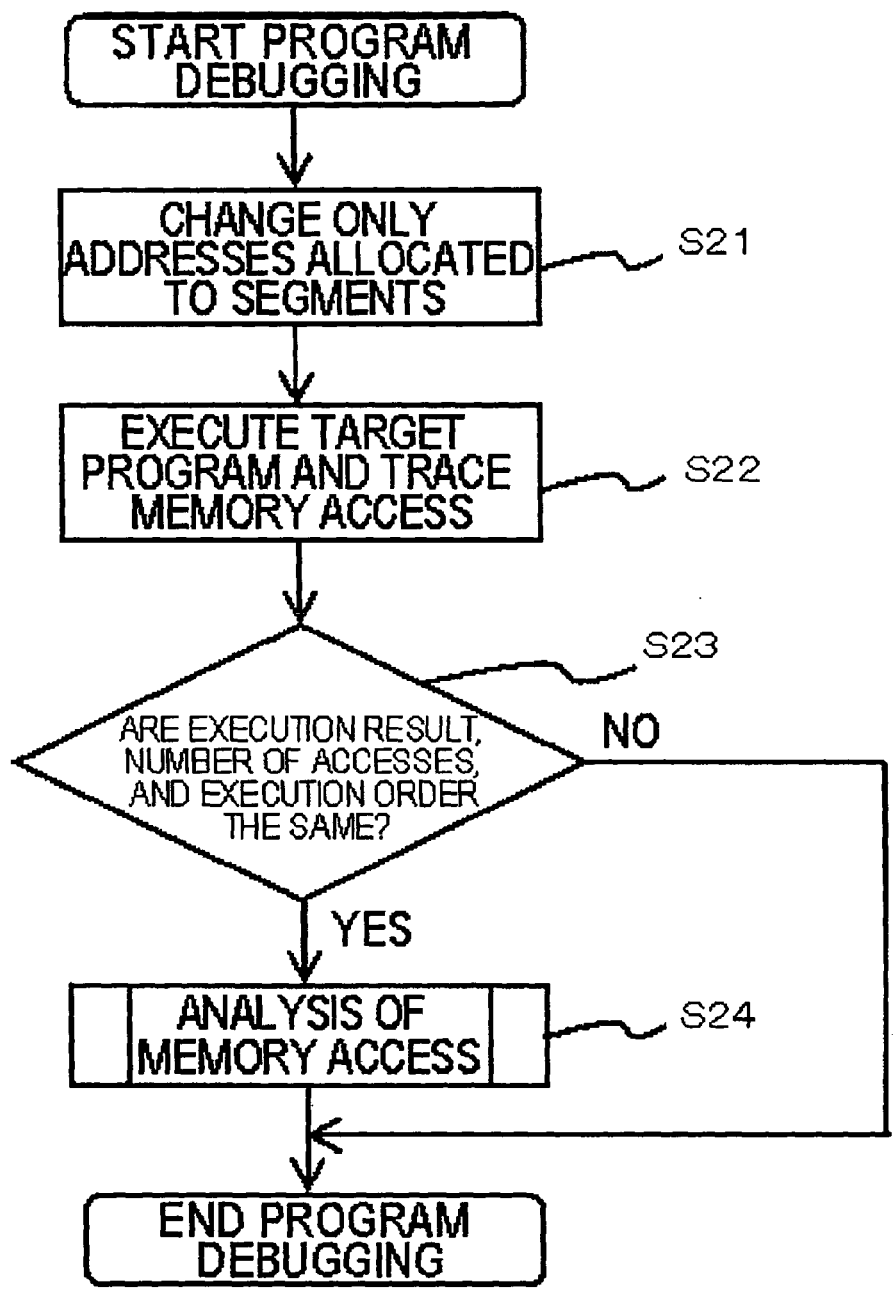
FIG. 2 is a flowchart illustrating a program debugging method according to the first embodiment of the present invention.

The program debugging device 1 according to this embodiment can execute a program to be tested according to the flowchart shown in FIG. 2. That is, when the debugging of the program to be tested starts, first, the program debugging device 1 changes only the addresses allocated to the segments to change the arrangement of the segments (Step S21). The program debugging device 1 executes the program in which the arrangement of the segments is changed and traces a memory access while maintaining the conditions other than the address. In this case, the program debugging device 1 obtains the reference address referred to by the memory access, and obtains an execution result indicating the execution result of the program, the number of accesses indicating the number of times the memory access is performed, and an execution order indicating the order in which a plurality of execution commands included in the program is executed. However, at least one of the execution result, the number of accesses, and the execution order may be obtained (Step S22). Then, the program debugging device 1 determines whether at least one of the execution result, the number of accesses, and the execution order is the same in all of the executions (Step S23). If it is determined that at least one of the execution result, the number of accesses, and the execution order is the same in all of the executions (Step S23: Yes), the program debugging device 1 performs a memory access analyzing process on the reference address of a memory access to be analyzed according to an execution command, which is an analysis target, among a plurality of execution commands and determines whether the memory access, which is an analysis target, is valid (Step S24). The memory access analyzing process will be described in detail below.

The above-mentioned procedure is an example of a procedure that can be applied to this embodiment, and the order of the procedure may be changed without departing from the scope of the present invention.

The program debugging device 1 according to this embodiment requires a program to be tested to reproduce an invariant operation to a change in the address arrangement of the segments. It is premised that, when input or operation conditions other than the address arrangement are the same, the program is processed in the same execution order and the same execution result is output.

When the preconditions are satisfied, the number of memory accesses and the order are the same, and there are accesses that correspond to each other even when the program is executed plural times while changing the address arrangement. Therefore, it is possible to extract the access addresses corresponding to the number of trace executions in all memory accesses. When a program to be tested includes an error and the program is executed in a different analysis order, the access from the start of the execution to the acquisition of correspondence is to be tested.

The memory access analyzing unit 132 may include a base segment specifying unit 133 that satisfies a base segment, which is a base for designating the address of a memory access to be analyzed based on the reference address of the memory access to be analyzed. When the base segment specifying unit 133 cannot specify the base segment, it may be determined that the memory access to be analyzed is not valid.

The memory access analyzing unit 132 may include a boundary test unit 134 that determines whether the reference address of the memory access to be analyzed is included in the base segment specified by the base segment specifying unit 133. When the boundary test unit 134 determines that the reference address of the memory access to be analyzed is included in the segment, it may be determined that the memory access to be analyzed is valid. When the boundary test unit 134 determines that the reference address of the memory access to be analyzed is not included in the segment, it may be determined that the memory access to be analyzed is invalid.

When the memory access analyzing unit 132 includes the base segment specifying unit 133 and the boundary test unit 134, it is possible to specify the base segment of the memory access to be analyzed, and it is possible to perform the boundary test on the memory access to be analyzed based on the specified base segment.

In this embodiment, for simplicity of description, it is assumed that T (T is an integer equal to or greater than 2) addresses are obtained, K (K is a positive integer) memory segments are identified, the size of a k-th segment (k=1, 2, ..., K) is sk, and the beginning address of the memory area allocated to the k-th segment during the tracing of a t-th set (t=1, 2, ..., T) is represented by ak(t).

The memory access that is correctly described in the program refers to data in the memory using the address obtained by adding an offset value i to the beginning address ak(t) of the effective k-th segment. When an address value during a t-th trace is represented by p(t) and the address is calculated using a segment k as a base, the following Expression 1 is established for t=1, 2, ..., T:

$$p(t)=ak(t)+i. \qquad \text{[Expression 1]}$$

When the access indicates a correct region, the offset value i satisfies the following Expression 2:

$$0 \leq i \leq sk-w \qquad \text{[Expression 2]}$$

(where w indicates the number of addresses that are accessed at the same time).

For example, when 1 byte is allocated to one address and 4 bytes are accessed at the same time, w is 4.

The base segment specifying process can be analyzed as a process for specifying the segment k satisfying Expression 1 from addresses p(1), ..., p(T). The segment boundary test process can be analyzed as a process for determining whether Expression 2 is satisfied. When the program is executed only once (T=1), it is difficult to solve Expression 1 as an equation. However, when an address is appropriately allocated, it is possible to calculate the segment k under the condition of T≧2.

When the offset value i is removed from Expression 1, the following Expression 3 is obtained:

$$p(t+1)-p(1)=ak(t+1)-ak(1) (t=1, 2, \ldots, T-1). \qquad \text{[Expression 3]}$$

It is preferable to search for a segment number k satisfying Expression 3 for t=1, 2, ..., T−1 in order to specify the segment number k from the address value. As a result, when there is no segment number k satisfying Expression 3, there is an invalid access that does not have the address obtained by exact calculation. When there is only one segment number k satisfying Expression 3, it is possible to specify a k-th segment as the base segment.

Therefore, in order to specify the base segment for calculating the address from the trace output of the memory access, the addresses may be allocated such that a set Dk of (T−1) numerical values represented by the following Expression 4 has a meaning value for the segment number k:

$$Dk=(ak(2)-ak(1), ak(3)-ak(1), \ldots, ak(T)-ak(1)). \qquad \text{[Expression 4]}$$

Many address allocating methods for making Dk unique to the segment number k have been proposed. In this embodiment, three effective methods will be described. Since two sets of trace outputs are sufficient, T is 2 in the three methods. In this case, Dk is represented by the following Expression 5:

$$Dk=ak(2)-ak(1)=p(2)-p(1). \qquad \text{[Expression 5]}$$

Dk is equal to the difference p(2)−p(1) between the addresses obtained by executing a first set and a second set.

A first address allocating method arranges addresses such that Dk is included in the beginning address ak(1) of the segment. This can be achieved when the difference between the beginning addresses of adjacent segments during the execution of the second set is two times more than that during the execution of the first set. In this case, the following Expression 6 is established:

$$ak(2)-a1(2)=2\{ak(1)-a1(1)\}. \qquad \text{[Expression 6]}$$

When Expression 6 is substituted into Expression 5, it is possible to obtain the following Expression 7 for calculating the beginning address ak(1) of the segment:

$$ak(1)=p(2)-p(1)-a1(2)+2a1(1). \qquad \text{[Expression 7]}$$

This method requires a memory capacity that is two times more than that when the second program is executed, but can simply calculate the segment, which is a base for calculating the address.

Figure 3:
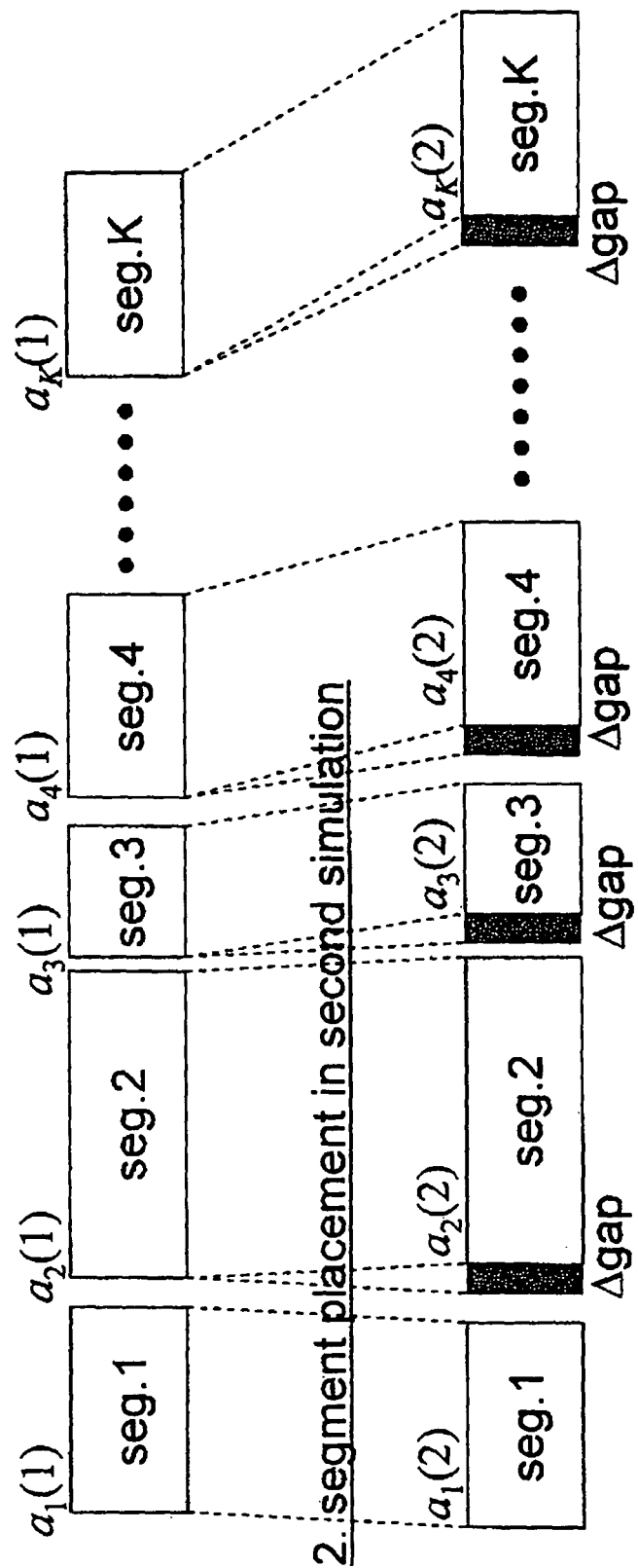
FIG. 3 is a diagram illustrating an example of a method of arranging memory segments according to the present invention.

FIG. 3 is a diagram illustrating a second address allocating method (segment arrangement method) according to this embodiment. The second address allocating method arranges the segments such that Dk includes the segment number. This can be achieved by arranging the segments such that the address number of the segment is identical to the segment number k and allocating the addresses such that the difference between the length of the gap between adjacent segments in the first execution and the length of the gap therebetween in the second execution is constant, as shown in FIG. 3.

An equality established by this allocation is represented by the following Expression 8:

$$ak+1(2)-ak(2)=ak+1(1)-ak(1)+\Delta (k=1, 2, \ldots, K-1). \qquad \text{[Expression 8]}$$

When Expression 8 is composed with another k, the following Expression 9 is obtained:

$$ak(2)-ak(1)=a1(2)-a1(1)+(k-1)\Delta (k=1, 2, \ldots, K). \qquad \text{[Expression 9]}$$

When Expression 5 is substituted into the left side of Expression 9, the following Expression 10 is obtained:

$$k=1+\{p(2)-p(1)-a1(2)+a1(1)\}/\Delta. \qquad \text{[Expression 10]}$$

Expression 10 indicates that it is possible to effectively specify the base segment number k from the addresses p(1) and p(2) obtained from the trace with one calculating operation. When the obtained base segment number k is a non-integer or does not correspond to a valid segment number, the access may be determined to be invalid.

FIG. 4 is a diagram illustrating a third address allocating method (segment arrangement method) according to this embodiment. As shown in FIG. 4, in the third method, the arrangement order of the segments in the first simulation is reverse to that of the segments in the second simulation. When the segment number k is arranged in the same order as that in the second simulation, the address ak(2) monotonically increases for k, and the address ak(1) monotonically decreases. Therefore, the difference between the addresses (ak(2)−ak(1)=Dk) monotonically increases for k, which means that Dk is unique to k. When the addresses are allocated by the third method, it is possible to specify the base segment from two address values.

In the third method, it is difficult to specify the segment with a simple process, unlike the first method or the second method. However, it is possible to apply dichotomy using the monotonicity of Dk to search for k satisfying Expression 5, the calculation time does not increase and it is possible to perform the process within the logarithmic time of the number of segments. In addition, since the third method does not require a redundant memory area, it is advantageous in terms of the efficiency of the memory.

In the present invention, the addresses are allocated to the segments in the above-mentioned way and the program is executed plural times. The address values of the traced memory accesses are compared with each other based on the execution result, and the memory segment, which is a base for calculating the address, is specified for each memory access. In this way, it is possible to perform correct boundary determination.

The present invention does not have the problem that it is difficult to detect discontinuous memory accesses, unlike the guard zone type that is used in the technique related to the present invention. In addition, in the present invention, the base segment is not stored in a variable in the program or the value of the memory, unlike the FAT pointer type that is used in the technique related to the present invention. Therefore, the present invention does not have the problem that it is difficult to correspond to the logical operation or the decomposition of the address value. According to the present invention, it is possible to perform a memory accesses boundary test on the program including the calculation of a given address value as long as the program is normally operated for the addresses of the segments arranged in a plurality of patterns.

Figure 5:
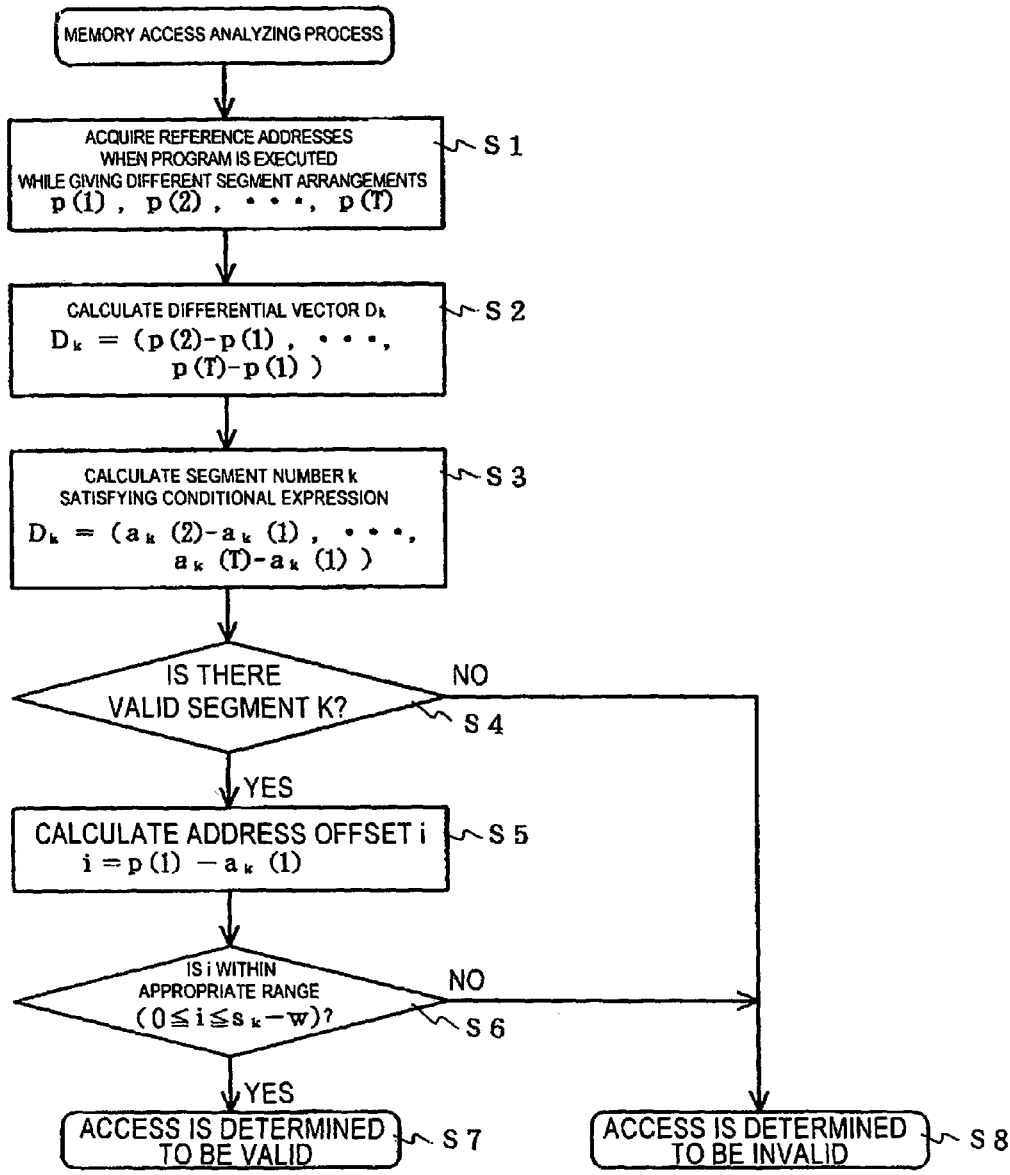
FIG. 5 is a flowchart illustrating a process of analyzing a memory access according to the first embodiment of the present invention.

FIG. 5 is a flowchart illustrating a process of analyzing a memory access according to the first embodiment of the present invention. The process of analyzing a memory access according to the first embodiment of the present invention will be described with reference to FIG. 5. A CPU (central processing unit) (not shown) of the program debugging device 1 shown in FIG. 1 executes a computer executable program to implement the process shown in FIG. 5.

In this embodiment, the program debugging device acquires the address referred to by a memory access that is desired to be analyzed and a reference address referred by the access when a different segment arrangement is given to the program and then the program is executed (Step S1). Here, it is assumed that a total of T reference addresses are acquired (T is an integer equal to or greater than 2) and the reference addresses are represented by $p(1)$, $p(2)$, $p(t)$. In this case, in the arrangement of T sets of segments, similar to the above, the size of a k-th segment (k=1, 2, ..., K) is sk, and the beginning address of the memory area allocated to the k-th segment during the trace execution of a t-th set (t=1, 2, ..., T) is represented by ak(t).

When the T reference addresses are obtained (Step S1), the program debugging device 1 searches for the segment number k satisfying Expression 3 (Steps S2 and S3). As a result, when there is no valid segment number k (Step S4: No), the program debugging device 1 determines that the access (access to be analyzed) is an invalid access in which no segment is a base for calculating the address (Step S8). When there is the valid segment number k (Step S4: Yes), the program debugging device 1 specifies a k-th segment corresponding to the segment number k as the base segment.

After Step S5, a boundary test process is performed subsequent to the base segment specifying process. The program debugging device 1 calculates the offset i ($i=p(1)-ak(1)$) added to the base address (Step S5). When the offset i is an integer ($0 \leq i \leq sk-w$) that is equal to or less than a value obtained by subtracting the number of addresses designated by the reference address from the size of the base segment (Step S6: Yes), the program debugging device 1 determines that the reference address is included in the segment and determines that the memory access (memory access to be analyzed) is valid (Step S7). In addition, when the offset i is out of the range (Step S6: No), the program debugging device 1 determines that the memory access is invalid (Step S8).

These processes are implemented by the base segment specifying method represented by the memory segment arrangement method according to the present invention, and it is possible to perform an effective boundary test on each memory access.

Figure 6:
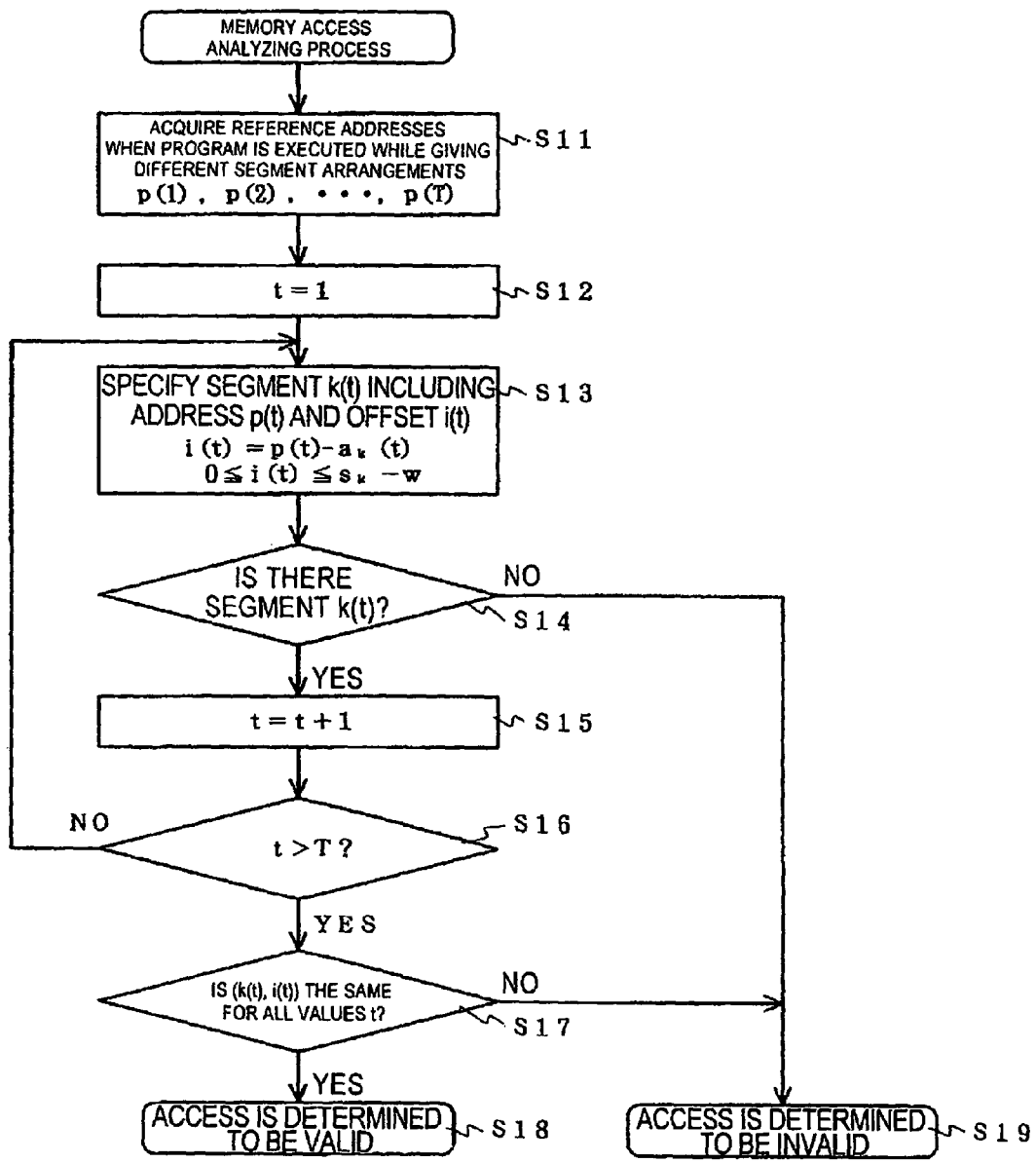
FIG. 6 is a flowchart illustrating a process of analyzing a memory access according to a second embodiment of the present invention.

FIG. 6 is a flowchart illustrating a process of analyzing a memory access according to a second embodiment of the present invention. A program debugging device according to the second embodiment of the present invention has the same structure as the program debugging device 1 according to the first embodiment of the present invention shown in FIG. 1. Therefore, the process of analyzing a memory access according to the second embodiment of the present invention will be described with reference to FIGS. 1 and 6. However, the CPU of the program debugging device 1 shown in FIG. 1 executes a computer-executable program to implement the process shown in FIG. 6.

In this embodiment, the program debugging device 1 acquires T address values $p(1)$, $p(2)$, $p(T)$ obtained by performing the program when the addresses are arranged in a different pattern, in the same way as that in the first embodiment of the present invention (Step S11).

Then, the program debugging device 1 specifies a segment k(t) including the address p(t) for all values t and calculates the offset i(t) (Steps S12 to S16). When there is an address p(t) that is included in an invalid segment (Step S14: No), it is determined that the memory access is performed by wrong address calculation (Step S19).

When the segments and the offset values are calculated for all of the address values p(t), the program debugging device 1 compares the segments and the offset values for all values t and determines whether they are identical to each other. As a result of the comparison, if it is determined that all of the segments and the offset values are not identical to each other (Step S17: No), the program debugging device 1 determines that the access is performed by wrong address calculation (Step S19).

These processes check that the conditional expresses represented by Expressions 1 and 2 are established for all values t. In this way, in this embodiment, it is possible to perform the memory access boundary test.

A third embodiment of the present invention relates to an example of a method of performing a boundary test on an access to the segments that are statically arranged. An example of the structure required for this embodiment will be described with reference to FIG. 1. The memory access tracing units 11-1 to 11-T shown in FIG. 1 are T units that generate an executable program from a static library or an object file obtained from the program described in the C language or obtained by compiling the program with a C language compiler, execute the executable program with a simulator, and trace memory accesses (T is an integer equal to or greater than 2).

Specifically, the memory access tracing units 11-1 to 11-T generate necessary object files using the C language compiler and combine the object files while arranging a static segment at an appropriate address based on the determination of the address allocating unit 12, thereby generating an executable program. In addition, the memory access tracing units 11-1 to 11-T execute the generated executable program using the simulator, trace the address of a memory access performed at that time or the positional information of commands for the memory access, and outputs the trace result to the data analyzing unit 13.

The address allocating unit 12 checks the information of the static segment written in the object file of the program, determines T sets of addresses arranged for the segment that is used, and transmits instructions to the memory access tracing units 11-1 to 11-T. It is assumed that the arrangement is determined by, for example, the above-mentioned first to third methods.

The data analyzing unit 13 determines whether the execution order of the commands issued when the memory access tracing units 11-1 to 11-T execute the program or the output result of the program to the outside is logically the same except for the arrangement of the addresses or other accidental factors.

If it is determined that there is no equivalence, the data analyzing unit 13 outputs an error message and ends the analyzing process. If it is determined that there is an equivalence, the data analyzing unit 13 extracts T sets of trace results corresponding to the same access for each memory access and checks whether this is a memory access corresponding to a static arrangement segment.

For example, this may be determined based on the magnitude of the address value or by checking the description of a corresponding execution command. As a result of the determination, when the access is a test target, the data analyzing unit 13 including the same structure as the boundary test unit 134 according to the first embodiment or the second embodiment of the present invention checks the segment used as a base for calculating the address of the memory access and performs a boundary test. When the access is invalid, the data analyzing unit 13 presents the result indicating that an invalid access has been detected and information indicating the description position of an execution command causing the invalid access.

The above-mentioned procedure according to this embodiment makes it possible to perform the boundary test to determine whether an access to the data segments that are statically arranged indicates a valid address range.

However, it is assumed that the size of the segment to be subjected to the boundary test is appropriately selected according to test purposes. For example, global variables (including arrangement) with different names are treated as different segments, or a program is appropriately divided into files and a set of variables included in the same file is treated as one segment.

In this embodiment, the T memory access tracing units 11-1 to 11-T execute the program that has been transformed into an executable format using the simulator and trace the memory access. However, any other units may be used as long as they can obtain the same result as described above.

For example, a processor or hardware with a function of tracing the memory access may be used. Alternatively, an appropriate command description may be added to a given program and the data analyzing unit 13 may output an address value before a memory access is performed. In this case, when the program is transformed, a structure capable of identifying the access in the original program description even after a trace is run is provided. Alternatively, for example, a program that performs the boundary test of the memory access while executing T sets of programs performed by itself at the same time is created from the original program.

After the T memory access tracing units 11-1 to 11-T execute the program, the trace result may be transmitted to the data analyzing unit 13 by any unit or at any time as long as the same effects as described above can be obtained. For example, the data analyzing unit 13 may be operated at the time when the T trace units are operated at the same time and a memory access is performed. The trace result obtained by executing the program to the end may be output to a storage unit, such as a memory or a disk device and the data analyzing unit 13 performs a test while reading the stored T sets of trace results.

In this embodiment, the arrangement of the addresses to the segments is designated when the object files are combined with each other to create an execution file. However, any other methods may be used as long as the same effects as described above can be obtained. For example, the address values may be explicitly described in an input C language program, a program with an executable format may be analyzed, and a command description may be changed.

A fourth embodiment of the present invention is an example of a method of performing the boundary test on the memory segments dynamically allocated from a heap. This embodiment is implemented by the structure shown in FIG. 1, similar to the third embodiment of the present invention. Next, only the difference between the fourth embodiment and the third embodiment of the present invention will be described.

In this embodiment, the arrangement addresses of the segments are determined when a heap memory operation function is called during the execution of a program to be tested. A function for a heap operation is mainly a set of a function that has a designated size and ensures a continuous memory and a function that releases it. When the standard library of the C language is used, for example, a malloc function or a free function is used. In the case of the C++ language, for example, a new function or a delete function is used. In addition, a function provided by an OS (operating system) in an execution environment may be used, or an independent function provided in the program may be used as long as it has the same function as described above.

In this embodiment, when the memory access tracing units 11-1 to 11-T execute T sets of programs, the call of the heap operation functions returns different address allocation results, and the test is performed in an appropriate range. For example, a program is described in the C language or it is input in the format of an object file, and a heap operation function library combined when the program is transformed into an executable format is substituted with another one that can allocate addresses for test.

As another example, an executable format is created such that the heap operation function in a dynamic library [for example, a common library in Linux and a DLL in Windows®] is used, and the library used during execution is substituted. Alternatively, when the simulator executes the program, the call of the heap operation function may be substituted with a test process, or when the program is analyzed and is transformed into a test program, addresses for test may be allocated.

In this embodiment, the allocation and deallocation of the addresses to the memory segments are dynamically repeated. Therefore, in the boundary test of each access, it is necessary to perform a test in the temporal direction in order to determine whether a reference segment is valid, in addition to a test for the address range. Therefore, in this embodiment, the call of a heap allocation function and a heap deallocation function is also traced and a temporal relationship with the memory access is also tested. In this case, in order to independently recognize an access referring to the deallocated segment that has been previously used and an access to a newly allocated segment, it is necessary to allocate the addresses such that the value of Expression 4 is constant in all of the segments.

Therefore, special attention is needed when the segment which is deal located once is allocated again.

According to the above-mentioned structure of this embodiment, it is possible to perform the boundary test on an access to the data segments arranged on the heap.

A fifth embodiment of the present invention is an example of a method of performing the boundary test on the memory segments arranged on a stack. This embodiment is implemented by the structure shown in FIG. 1, similar to the third embodiment of the present invention. Next, only the difference between this embodiment and the third embodiment of the present invention will be described.

In this embodiment, the segment on the stack means a continuous memory area including an automatic variable (including arrangement) declared in the function, or a return address and an argument arranged on the stack when the function is called, in the program described in, for example, the C language. A set of a plurality of variables may be used as one segment, and the unit of the segment may be changed according to test purposes. The number of valid segments or the arrangement thereof is dynamically changed during the execution of the program. The address of the arranged segment is relatively determined using a stack pointer, which is given when the program is executed, as a base.

The T memory access tracing units 11-1 to 11-T are provided in an environment in which they can execute the program while changing the allocation of the addresses to the segments. For example, an interpreter-type execution environment is used which executes an input program that is described in the C language while directly analyzing it.

In addition, when the C language program is transformed into an executable format, a plurality of programs using the stacks in different ways may be generated. Alternatively, a plurality of programs may not be generated, the position where a machine language command accessing the stack is described may be recorded on a file, and the simulator executing an executable program may correct an operation while referring to the file.

In the boundary test performed by the data analyzing unit 13, the arrangement of valid segments at that time needs to be correctly recognized. Therefore, in the structure in which a C language description is transformed into an executable format, it is necessary to trace appropriate information, such as segment information used in each function, the order in which the functions are called during the execution of the program, and the value of the stack pointer.

According to the above-mentioned structure of this embodiment, it is possible to perform the boundary test on an access to the data segments that are arranged on the stack.

A sixth embodiment of the present invention is an example of a method of performing the boundary test on the segments arranged on the stack in the unit of functions. This embodiment is implemented by the structure shown in FIG. 1, similar to the fifth embodiment of the present invention. Next, only the difference between this embodiment and the fifth embodiment of the present invention will be described.

In this embodiment, the segment, which is a test unit, is defined as a continuous memory area that is accessed by each function through the stack pointer. The number of valid segments or the arrangement thereof is dynamically changed when the program is executed.

In a program debugging device 1 according to this embodiment, the segment of the program may be defined as a continuous memory area in which a relative address reference using the stack pointer as a base is allowed, in one function or one function group including child functions called from the function. When a function is called during the execution of the program, a segment corresponding to the function and the stack pointer may be moved to another address, and when the function returns to the call source, the segment and the stack pointer may be moved to the original address.

In the program debugging device 1 according to this embodiment, when a second function or a second function group is called while a first function or a first function group is executed, a region obtained by removing an overlap region with a continuous memory area defined for the second function or the second function group from the continuous memory area defined for the first function or the first function group may be a segment defined for the first function or the first function group.

Specifically, it is assumed that, while a function f1 is executed, the function f1 is called out from a function f2, the function f2 is called out from the function f3, a function fN-1 is called out from a function fN (n is an integer equal to or greater than 1), and the function fN is an initial function. In this case, N valid segments are defined.

A first segment is a continuous memory area (which is defined as an access area of the function f1) on the stack indirectly accessed by the function f1 using the stack pointer. A second segment is a continuous memory area obtained by removing the access area of the function f1 from the access area of the function f2. Similarly, an N-th segment is a continuous memory area obtained by removing the access area of the function fN-1 from the access area of the function fN.

The access area of the function fn (n is an integer equal to or greater than 1) includes the argument of the function fn on the stack, a return address, a stack area (which includes an area in which arguments or return values are placed in order to call another function, but does not include a stack area in which the called function is used) that is temporarily used in the function fn, and a stack area (there is no case in which the return value returns to the register) used to output a function return value.

Figure 8:
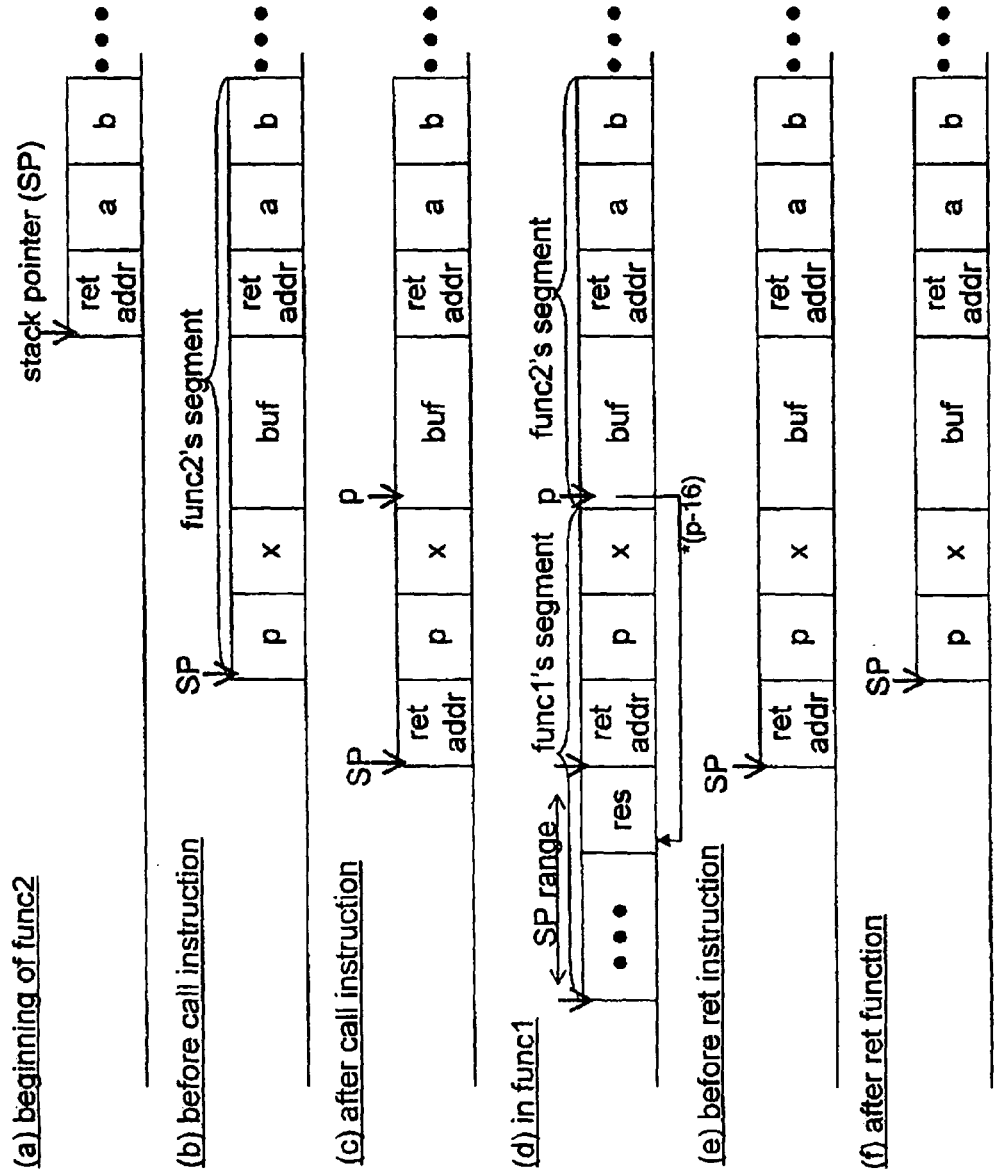
FIG. 8 is a diagram illustrating the state of a stack and the transition of a stack pointer over time when the program is executed in the sixth embodiment.
Figure 9:
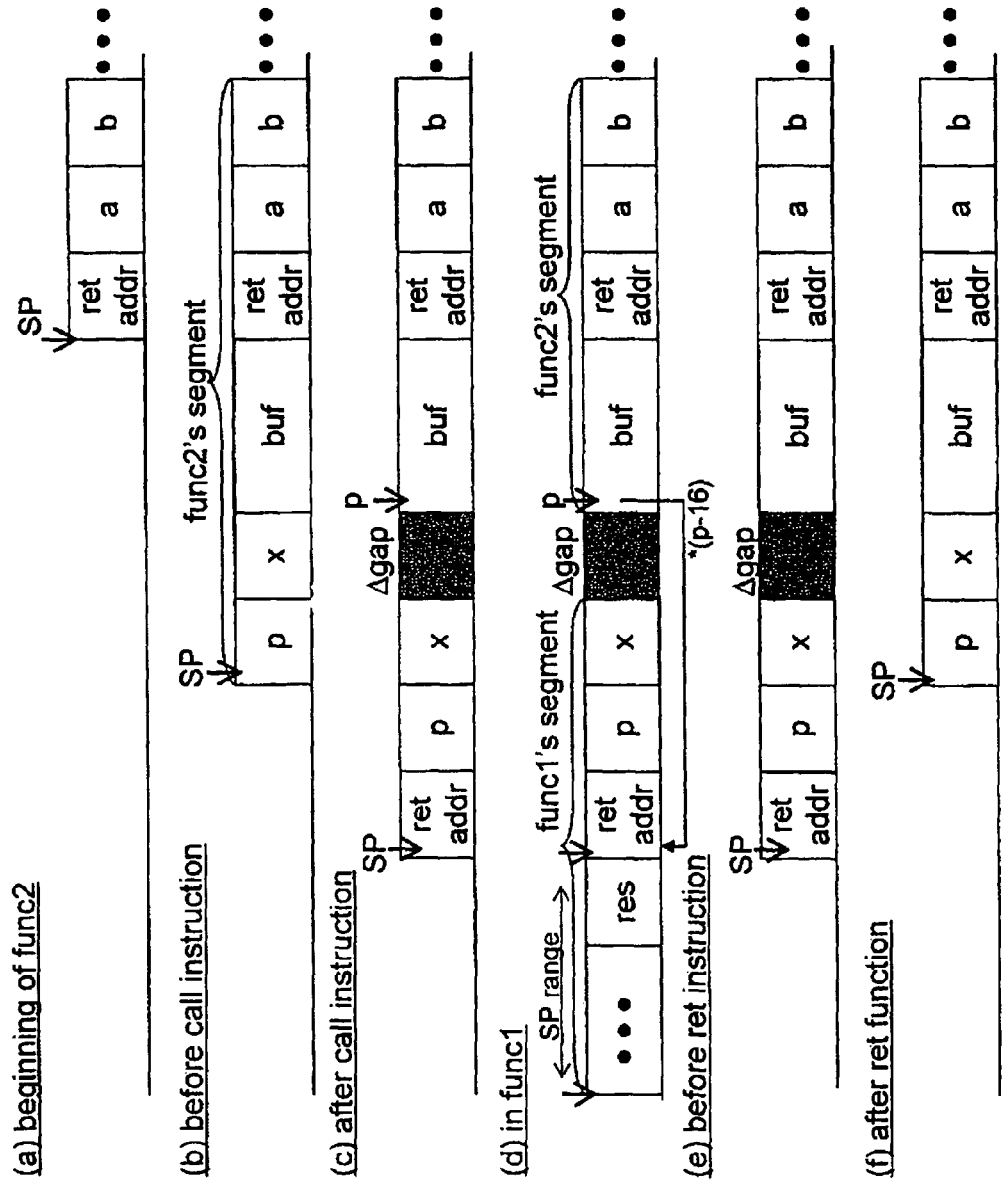
FIG. 9 is a diagram illustrating the state of the stack and the transition of the stack pointer over time when a process of moving the stack is performed in the sixth embodiment.

FIG. 7 is a diagram illustrating an example of a C language program for describing the operation of the program debugging device 1 according to the sixth embodiment of the present invention. FIG. 8 is a diagram illustrating the state of the stack and the transition of the stack pointer over time during the execution of the program in the sixth embodiment of the present invention. FIG. 9 is a diagram illustrating the state of the stack and the transition of the stack pointer over time when a stack moving process is performed in the sixth embodiment of the present invention.

FIG. 8 shows a detailed example of the above-mentioned definition, and also shows the usage state of the stack and the transition of the stack pointer over time when the C language program description shown in FIG. 7 is compiled and executed. In this example, the function is called out based on a calling convention which is called 'cdecl'.

In the calling convention, the argument of the function and the return address are stacked on the stack in the decreasing order of address. FIG. 8(a) shows the state immediately after a function func2 is called in a 12th row of the program shown in FIG. 7. In FIG. 8(a), arguments b and a and the return address are placed on the stack in this order. FIG. 8(b) shows the state immediately before a machine language command to call the function func1 is executed in a 14th row of the program shown in FIG. 7. In FIG. 8(b), an arrangement variable buf ensured by the function func2 and arguments p and x passed to the function func1 are placed on the stack.

FIG. 8(c) shows the state immediately after a machine language command to call a function is executed. In FIG. 8C, the return address of the function is stacked on the stack. FIG. 8(d) shows the function func1 that is being executed. FIG.

8(e) shows the state immediately before the return of the function. FIG. 8(f) shows the state immediately after a machine language command to return from the function func1 to the function func2 is executed.

In this example, the access area of the function func2 is a memory area in the range shown in FIG. 8(b). In FIGS. 8(a) and 8(b) and FIGS. 8(e) and 8(f), this range is a segment of the function func2. In FIG. 8(d), the access area and the segment of the function func1 is a stack area shown on the left side of FIG. 8(d). In this state, since an overlap portion between the segment of the function func2 and the segment of the function func1 is removed, the segment of the function func2 is an area in the range shown on the right side of FIG. 8(d).

The boundary test according to this embodiment is performed by the structure shown in FIG. 1, similar to the fifth embodiment of the present invention. However, the program input by the memory access tracing units 11-1 to 11-T does not need to be described in the C language, but it may be of an executable format. In this case, information for identifying the function included in the program during the execution of the program and information including the address range of the segment accessed by each function through the stack pointer may be input as auxiliary information.

The arrangement of the segments on the stack is changed as follows: when the memory access tracing units 11-1 to 11-T execute the program using the simulator, the command processed by the simulator or the address of the command is monitored, and the simulator moves the stack pointer and the address of the segment arranged on the stack at the time when a function call command and a function return command are executed.

In this embodiment, an example of a method of arranging the segments and performing a test based on the first method will be described. When the first trace of a memory access is obtained, as shown in FIG. 9, the program is executed similar to the general case. When the second trace is obtained, a Δ-byte gap region is inserted between the segments.

FIG. 9 shows the usage state of the stack and the transition of the stack pointer over time when the program is executed in the same way as that in FIG. 7 in order to obtain the second trace. It is assumed that the size Δ of the gap region is 4 bytes and the storage area of an int variable or a pointer variable is also 4 bytes. FIG. 9(b) shows the state before a function call command is executed after the stacking of the arguments on the function func1 is completed.

When the simulator detects the command to call the function func1 immediately after the function call command is executed, the simulator moves the segments of the function func1 by Δ bytes in the direction in which the address decreases. Specifically, the arguments p and x stacked on the stack are moved to the left side to change the value of the stack pointer, and the function is called. As a result, the state shown in FIG. 9(c) is obtained.

Thereafter, as shown in FIG. 9(d), the function func1 is executed. As shown in FIG. 9(e), when the simulator detects the execution of a command to return to the function func2, the simulator returns the arguments p and x and the stack pointer to the original state shown in FIG. 9(b) and proceeds to the state in which the remaining process of the function func2 is performed.

When the program is executed through the above-mentioned procedure to trace the memory access, valid segments are closely arranged in each state during the execution of the first trace, and the Δ-byte gap region is provided between the segments during the execution of the second trace. As a result, the addresses are allocated to the segments that are defined so as to be associated with the functions, based on the first method shown in FIG. 3.

In this embodiment, it is possible to perform the boundary test on each memory access by tracing the memory access when the program is executed in the arrangement shown in FIG. 9 and comparing the trace result with that in the arrangement shown in FIG. 8.

Next, the execution of the program shown in FIG. 7 will be described. A 6th row of the program shown in FIG. 7 is a valid access referring to the segment of the function func1, and a 7th row of the program shown in FIG. 7 is an access beyond the range that refers to the segment of the function func2.

When the program is executed in the stack arrangement shown in FIG. 8, both the 6th row and the 7th row cause a memory access to the address of a variable 'res'. Therefore, only the tracing of the memory access is insufficient to discriminate the 6th row from the 7th row, and it is difficult to detect an invalid memory access.

However, in FIG. 9 in which the Δ-byte gap is provided, an access in the 7th row does not have a variable res unlike an access in the 6th row and an access to a memory area adjacent to the return address is performed. It is possible to specify the segment referred to by the access in the 7th row and the access in the 6th row from the address values of the access in the 7th row and the access in the 6th row, based on the difference between the structure shown in FIG. 8 and the structure shown in FIG. 9, which makes it possible to perform a correct boundary test. In this case, the 6th row is executed without any problem, and the 7th row is detected as an access beyond the range.

In the above description, for each function included in the program, the range of the memory in which a relative access reference using the stack pointer is allowed needs to be input as auxiliary information or it needs to be acquired during compiling. However, the information may be simplified such that only the number of bytes of data stacked on the stack is used as the argument.

In this case, since the lower limit (the boundary in the left direction of FIG. 9) of the access area of the function that is being executed is not known, for example, the lower limit of the memory area that is given as the stack is used as the segment of the function. For a function in the call stack, an area overlapping the segment of a function called after the function is removed. Therefore, it is possible to calculate the lower limit of a valid segment from a pointer when the function is called and the number of bytes of the argument.

In the above description, the calling convention of the function is a cdecl type, but other calling conventions, such as PASCAL and fastcall, may be used. In the above description, the segment on the stack is moved immediately before the simulator processes the function call command and immediately after it processes the function return command. However, the segment on the stack may be moved immediately after the simulator processes the function call command and immediately before it processes the function return command. The definition of the segment is amended such that the return address is pushed to the stack without any problem when the function is called.

In the above description, one segment is defined for one function. However, one segment may be defined for one function group including child functions or grandchild functions called from a given function.

In this embodiment, according to the above-mentioned structure and operation, it is possible to perform the boundary test on an access to the segments arranged on the stack in each function.

A seventh embodiment of the present invention is an example of a method of testing plural kinds of segments at the same time. Specifically, the seventh embodiment relates to an example of a method of performing the boundary test on a segment that is statically arranged and a segment arranged on the heap at the same time. This embodiment uses the structure shown in FIG. 1, similar to the first and second embodiments of the present invention.

Components according to this embodiment perform both the operation of the first embodiment of the present invention and the operation of the second embodiment of the present invention. Since the operation is a simple combination of the operation of the first embodiment of the present invention and the operation of the second embodiment of the present invention, a detailed description thereof will not be repeated.

When a plurality of tests is combined, attention needs to be paid to determining whether the address of the traced memory access is the stack or the heap. Various methods are considered to perform the determination. One method is to uniquely set an address difference Dk [which is calculated by Expression 4] for specifying a segment among all the segments, regardless of the kind of segments. Another method is to narrow the kind of segments in the obtained address range of the access and perform the test on each kind of segments.

According to this embodiment of the present invention, it is possible to perform the boundary test on memory accesses to plural kinds of segments at the same time when paying attention to the above-mentioned points. This is the same with combinations other than the combination of the static segment and the heap segment.

Figure 10:
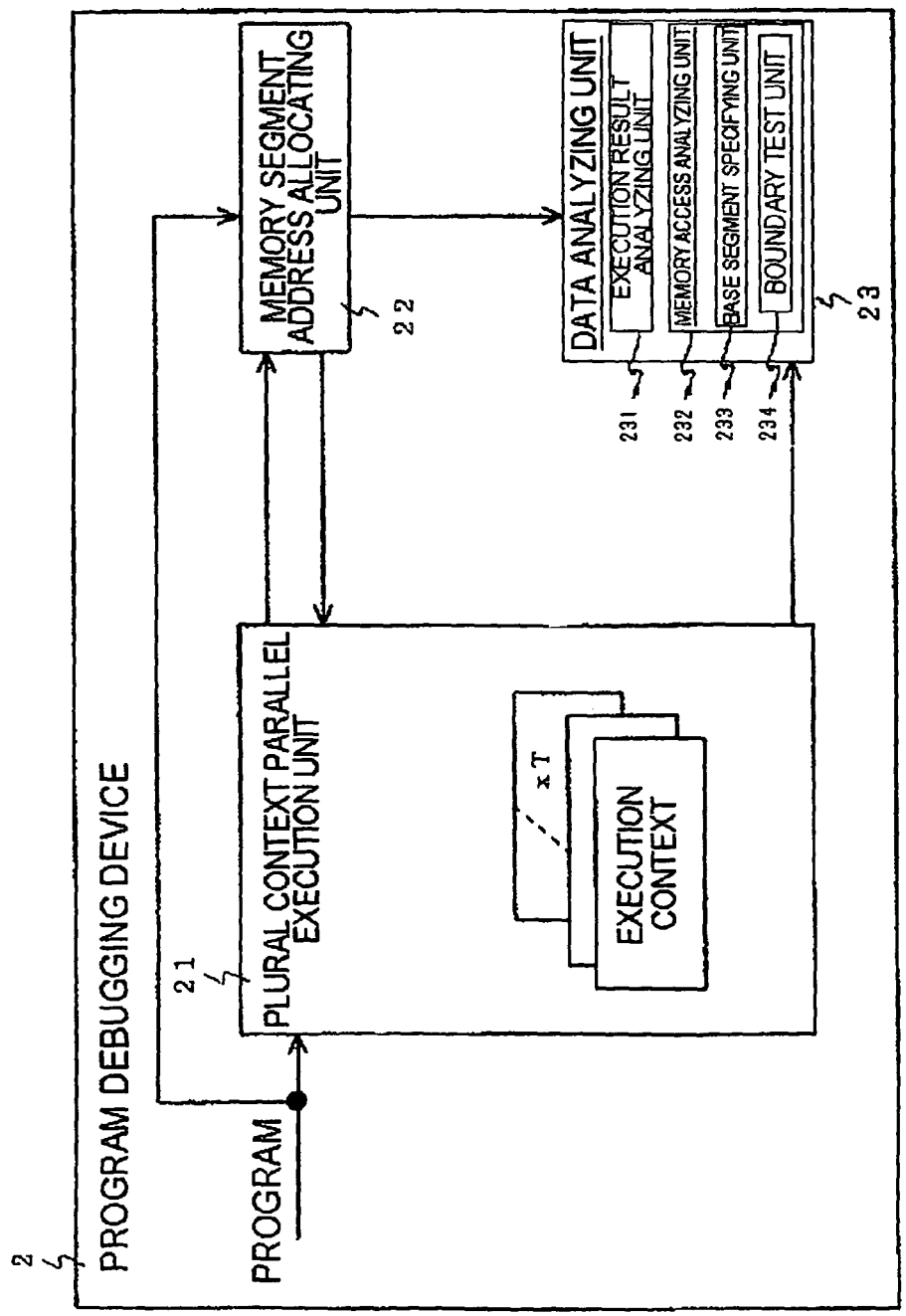
FIG. 10 is a block diagram illustrating an example of the structure of a program debugging device according to an eighth embodiment of the present invention.
Figure 14:
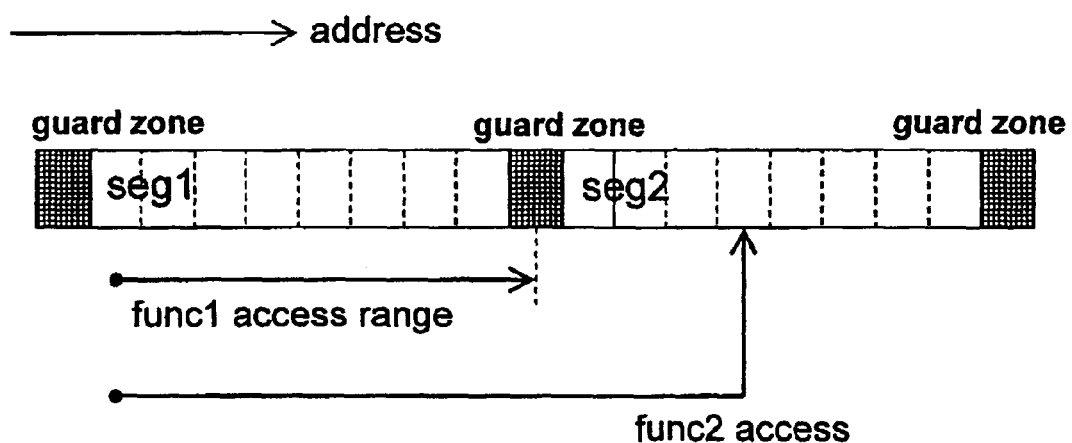
FIG. 14 is a diagram illustrating the problems of a boundary test method based on a guard zone type related to the present invention.

FIG. 10 is a block diagram illustrating an example of a program debugging device 2 according to an eighth embodiment of the present invention. FIG. 10 shows the structure and operation of a unit for obtaining a plurality of memory access trace results used in the boundary test. In FIG. 10, the program debugging device 2 according to the eighth embodiment of the present invention includes a plural context parallel execution unit 21, a memory segment address allocating unit (hereinafter, referred to as an address allocating unit) 22, and a data analyzing unit 23.

The data analyzing unit 23 includes an execution result analyzing unit 231 and a memory access analyzing unit 232. The memory access analyzing unit 232 may include a base segment specifying unit 233 and a boundary test unit 234. The address allocating unit 22 and the data analyzing unit 23 according to this embodiment, and the execution result analyzing unit 231, the memory access analyzing unit 232, the base segment specifying unit 233, and the boundary test unit 234 included in the data analyzing unit may perform the same operations as the address allocating unit 12, the data analyzing unit 13, the execution result analyzing unit 131, the memory access analyzing unit 132, the base segment specifying unit 133, and the boundary test unit 134 according to the first embodiment.

In this embodiment, the plural context parallel execution unit 21 that stores a plurality of program execution contexts and updates the program execution contexts at the same time is used to execute a program and trace a memory access under a plurality of address allocation conditions. Hardware capable of executing a plurality of contexts in parallel to each other may be prepared in order to execute the program, or the hardware may be virtually constructed.

Specifically, the plural context parallel execution unit 21 of the program debugging device 2 according to this embodiment may generate a virtual execution environment in which a plurality of stored values is stored in a register and a memory used by the plural context parallel execution unit 21, and store, in the register and the memory, a plurality of stored values obtained when the program is executed based on the arrangement of the segments changed by the address allocating unit 22, thereby calculating a reference address. Alternatively, the plural context parallel execution unit 21 may generate a test program that performs the same process as that when the program is executed plural times using the virtual execution environment to obtain a reference address and execute the program to obtain the reference address.

For example, a virtual execution environment having the shadow value disclosed in Non-patent Document 2 is constructed, contexts other than the first context are stored as the shadow value, and the test is performed. In this example, the execution context means the storage state of values in a register and a memory of a processor or the state of a program executing unit.

FIG. 11(a) shows the state of the memory when two programs are executed in parallel. In FIG. 11(a), three segments from the left side are arranged at different addresses in two contexts. Variables a, b, and c that are not affected by the allocation of addresses have a common value, and pointer variables p have different addresses in two contexts.

As described above, in the present invention, it is premised that the logical operation of a program to be tested does not vary even though the allocation of addresses to the segments is changed. It is possible to check whether this condition is satisfied by sequentially comparing the execution processes to determine whether the execution orders of the programs between a plurality of contexts are identical to each other.

In this case, when the operations are logically identical to each other and there is a branch that depends on the allocation of the addresses but cannot be removed (for example, which corresponds to a case in which a process of rounding down the address is performed by an if statement), a certain method capable of preventing this condition from being determined to be invalid needs to be used. For example, any of the following methods may be used: a method of designating exception during a test; a method of transforming a program description; and a method of restricting the arrangement of addresses.

In this embodiment, the time required to execute the program can be reduced as follows. For example, when it is possible to predict that the same process will be performed on all contexts, one command execution process is performed based on the prediction, thereby reducing the time required for simulation. For example, when the values stored in the register are equal to each other between all the contexts, it is possible to reduce the time required for simulation in a section in which a command to access a memory or a command not to treat the values that do not depend on the arrangement addresses of the segments is described.

In addition, in order to easily perform the parallel update of the contexts, the following method may be used: the test for determining whether the logical operations are identical to each other is skipped, and a plurality of contexts is updated assuming that the order in which the program is executed in the contexts other than the first context is completely identical to that in the first contest.

According to the above-mentioned structure, in this embodiment, it is possible to check the boundary violation of a memory access in only one test using the execution environment in which a plurality of contexts is updated at the same time.

A ninth embodiment of the present invention is an example of a method of executing a program once to obtain the trace results of a plurality of contexts, similar to the eighth embodiment of the present invention. The ninth embodiment is implemented by the same structure as that shown in FIG. 10. As the execution environment, a structure similar to the shadow value disclosed in Non-patent Document 2 is used. However, this embodiment is different from the eighth embodiment of the present invention in that one context is selected as a main context, and the stored values of the other contexts are stored as the shadow values so as to be associated with a principal value, which is the stored value of the main context. This association is performed by making data and registers referred to by the same address offset of the same segment correspond to each other in a logical meaning.

In the program debugging device 2 according to this embodiment, the plural context parallel execution unit 21 may generate a virtual execution environment in which a plurality of stored values is stored in the variables used in the program and store, in each variable, a plurality of stored values obtained when the program is executed based on the arrangement of the segments changed by the address allocating unit 22, thereby executing the program to calculate a reference address. Alternatively, the plural context parallel execution unit 21 may generate a test program that performs the same process as that when the program is executed plural times using the virtual execution environment to obtain a reference address and execute the program to obtain the reference address.

FIG. 11 is a diagram illustrating the difference between the eighth and ninth embodiments of the present invention and the method related to the present invention. FIG. 11(*a*) shows the execution state of the eighth embodiment of the present invention. As shown in FIG. 11(*a*), execution contexts are individually held in two segment arrangements.

In contrast, in FIG. 11(*b*) showing this embodiment, a first context is treated as a main context, and a second context is stored as the shadow value. In addition, the storage address of the shadow value is not the address arrangement of the second context, but is the storage address of data, which is logically the same as the shadow value, in the main context.

For example, a leading element b[1] of an arrangement variable b[5] is stored at an address 2CH in the second context shown in FIG. 11(*a*). However, in FIG. 11(*b*), similarly, an actual value is stored in the shadow region of data at an address 24H where the first context is stored while the context stored at the address 2CH is virtually held. However, the value is stored as the shadow value in FIG. 11(*b*) on the assumption of dual execution shown in FIG. 11(*a*). Therefore, the shadow value at the address indicated by the pointer p which is stored at the address 24H is stored at the address 2CH, not the address 24H.

As can be seen from this operation, in this embodiment and the eighth embodiment of the present invention, a plurality of programs performs an essentially equivalent process. Therefore, it is possible to perform the same boundary test as that in the eighth embodiment of the present invention.

The ninth embodiment is compared with the method investigated by Nethercote et al. (the method disclosed in Non-patent Document 5). The method investigated by Nethercote et al. traces the value of the register or the memory in which the address of the segment is stored during the execution of a program of an executable format and stores information indicated by a pointer and a non-pointer and an identifier indicating the reference segment (in this case, the beginning address of the segment) in the shadow value.

FIG. 11(*c*) shows the state when the same test is performed by the method investigated by Nethercote et al. The state is different from the example [FIG. 11(*b*)] according to this embodiment in the expression form of information stored in the shadow value. When the variable p is a pointer indicating the second segment from the left side, in FIG. 11(*c*) showing the method investigated by Nethercote et al., an address 20H, which is the beginning address of the reference segment, is stored in the shadow value at an address 38H where the value of the variable p is stored.

In contrast, in FIG. 11(*b*) showing this embodiment, the value 2CH when the program is executed in the virtual context is stored as the shadow value, and the difference (2CH−24H=8) between the shadow value and the principal value is equal to the difference (28H−20H=8) between the virtual arrangement of the beginning address of the second segment and the main arrangement. In this way, the reference segment is represented.

This embodiment can perform the same test as that in the method investigated by Nethercote et al. and can perform the test even though an arbitrary operation for the address value is included in the program. For example, when a 4-byte pointer p is divided into the most significant two bytes and the least significant two bytes and the divided bytes are stored in different memory areas, it is difficult to trace and store the information of the reference segment in the shadow value in the method investigated by Nethercote et al. However, in this embodiment, there are no particular restrictions other than the storage of two contexts.

Therefore, this embodiment can be analyzed as an improved method capable of solving the problems of the method investigate by Nethercote et al. A FAT pointer including an address value and a segment identifier can be represented by the principal value of the address and the shadow value obtained by virtually calculating the address value substituted when another address is allocated and the program is executed, based on the principle of the present invention. This representation is good in terms of the flexibility of calculation.

However, as such, when the virtual execution environment capable of using the shadow value is used, it is possible to combine this embodiment with the method investigated by Nethercote et al. For example, the shadow value of the execution context may have a pointer to the base segment in addition to the shadow value according to the present invention. Alternatively, for example, a flag for selecting any one representation may be provided and the representation according to the present invention may have the shadow value only when it is difficult to perform a trace by the pointer to the base segment.

A tenth embodiment of the present invention is an example of a method of combining an execution context when the program is executed in a different address arrangement as the shadow value with the main context and storing the combination, similar to the ninth embodiment of the present invention.

In the ninth embodiment of the present invention, the value stored in the register or the memory when the executable program is analyzed and processed is treated as the execution context of the program. However, in this embodiment, the state of a variable that is described in, for example, the C language is regarded as an execution context, and a value obtained when the program is executed under a different address arrangement condition is stored in each variable.

In order to achieve the above-mentioned structure, any of the following methods may be used: a method of using a C language interpreter including a multi-context update function as the execution environment; and a method of directly generating an executable program that performs an operation equivalent to the above. Here, a method will be described which transforms a C language program to be tested into a C language program or a C++ language program that performs an operation equivalent to that of the C language program to be tested, transforms the program into an executable program, and executes the executable program, thereby performing the test.

This embodiment transforms an input program using the same processing unit as that in the Fail Safe C compiler disclosed in Non-patent Document 2 and through a procedure using the processing unit to generate an executable program that performs the boundary test of an address value before a memory access that is likely to refer to segments other than a valid segment, is interrupted when the memory access is invalid, and continuously performs the process described therein when the memory access is valid.

In this embodiment, the content of a process of analyzing a C language program and performing the boundary test during execution is common to the Fail Safe C except for the structure of the boundary test. In this embodiment, similar to the Fail Safe C, a pointer-type variable referring to a segment memory is substituted with an extension variable that is two times larger than the pointer-type variable and has the information of the reference segment, and an integer variable having the address obtained by the conversion of the pointer-type variable is substituted with the extension variable.

This embodiment is similar to the Fail Safe C in that a process of dynamically ensuring the memory segment or a process of obtaining the address of the memory segment is amended to set appropriate information to the extension structure, the boundary test is performed on an address value before a memory access, and the operation stops when the access is beyond the range.

This embodiment differs from the Fail Safe C in that the boundary test of the Fail Safe C is based on the FAT pointer type and this embodiment performs the boundary test using the method according to the first and second embodiments of the present invention.

FIG. 12 is a diagram illustrating a characteristic portion of the transformation of a program description performed in the tenth embodiment of the present invention. As shown in FIG. 12, the Fail Safe C converts an ObjType pointer-type variable into a FatPtr<ObjType> structure variable and stores a pointer 'base' indicating the head of the reference segment and an offset 'offset'.

In contrast, this embodiment substitutes the ObjType pointer-type variable into a DualPtr<ObjType> structure and stores a pointer value 'value' indicating a reference address during execution and a pointer value shadow_value that is stored when the allocation of the addresses is changed and the program is executed in a different way.

In the Fail Safe C, a ValType variable having the integer of the pointer stored therein is substituted with a FatInt<ValType> variable and the original stored value 'value' and the reference segment of the pointer before substitution are stored in the pointer 'base'. In contrast, in this embodiment, the ValType variable is substituted into a Dual<ValType> variable, and the original stored value 'value' and a virtual pointer value shadow_value stored when the allocation of the addresses is changed and the program is executed in a different way are stored.

In addition, this embodiment differs from the Fail Safe C in that, in the Fail Safe C, only a variable with a sufficient bit width to represent the address value is treated as the ValType variable and the variable substituted with the FatInt<ValType> variable is limited, but in this embodiment, a variable with any bit width may be treated as the ValType variable and all variables whose stored values are changed by a change in the arrangement address of the segment are substituted with the Dual<ValType> variable.

The program in which the substitution, the conversion, and the calculation of the values of the DualPtr<ObjType> variable and the Dual<ValType> variable are described is transformed into a program in which the operation described in the program before transformation is performed between value members and between the shadow_value members at the same time. In this case, a description including the address of the memory segment, specifically, a description of an address operator & and an arrangement name, and a description using the address returned by the malloc function use different address values in the value member and the shadow_value member.

Specifically, the segment address that is being executed is used to calculate the value member. In order to calculate the shadow member, for example, the addresses of the segments arranged by any one of the above-mentioned three address allocating methods according to the present invention are used. However, when the segment that is not a test target is referred to, the same value is stored in the values 'shadow_value' and 'value'.

In a memory access that is performed by applying an indirect reference operator * or an arrangement reference operator [ ] to the DualPtr<ObjType> pointer variable, similar to the Fail Safe C, a process of performing the boundary test in advance and stopping the execution of the program when the access is invalid is added. The boundary test is performed using two addresses 'value' and 'shadow_value' through the procedure according to the first embodiment or the second embodiment of the present invention, unlike the Fail Safe C.

When the pointer variable indicates a correct address, the process described in the original program is performed with reference to the ObjType variable disposed at the address indicated by the value member. Since shadow_value is a virtual address prepared for a test, it is not used for the actual memory access.

For an execution command to branch the order of analysis, specifically, a control statement, such as if, for, or while, or an execution statement including the evaluation formulas of operators ?, &&, and ||, when the evaluation result of value and shadow_value return to the same branch destination, the process of a branch destination is continuously performed, and when different results return to the branch destination, it is determines that there is an error and the execution of the program stops, using the DualPtr<ObjType> variable and the Dual<ValType> variable. In this way, an executable format is generated.

As described above, when the C program is transformed into an executable format based on this embodiment and is then executed, the program is performed once and it is possible to obtain the same result as that when two segment arrangements are given to the DualPtr-type and Dual-type value members and the shadow_value member and the programs are individually performed. It is possible to perform an effective boundary test based on the present invention using these address values.

In the Fail Safe C based on the FAT pointer type related to the present invention, it is difficult to test a program description that performs subtraction between the FatPtr<ObjType> pointers referring to different segments or a program description that performs an arbitrary logical operation on the address value stored in the FatInt<ValType> variable. In addition, it is difficult for the Fail Safe C based on the FAT pointer type to correspond to the description of a process of dividing an address indicated by the pointer into the most significant bits and the least significant bits and substituting the divided bits to a numerical type with a bit width that is half the address value.

In contrast, this embodiment is not a type in which the segment referred to by the pointer variable is stored, and does not have the above-mentioned restrictions. An executable format performing an effective boundary test is generated as long as the program is appropriately performed by the allocation of the addresses assumed in order to obtain two values 'value' and 'shadow_value'.

As a modification of this embodiment, for example, the base pointer may be added to DualPtr and Dual structure types using the FAT pointer type related to the present invention. Alternatively, a program that switches two kinds of representations during the execution of the program may be generated.

In this embodiment, the C language program is a test target. However, programs described in other languages with the pointer variable may be tested in the same way as that in the above-described embodiments.

As such, according to the present invention, when the allocation of the addresses to the memory segments is changed and a program to be test is executed, the reference address obtained by the same program description is calculated by a method of actually executing the program plural times or a virtually equivalent method, the reference segment, which is a base for calculating the addresses, is specified from the information, and the consistency of the boundary between the segments is tested.

The reference segment can be specified by making the difference between the beginning addresses of the segment before and after the allocation of the addresses is changed include information for identifying the segment. According to this principle of the present invention, it is possible to reliably perform the segment boundary test on each memory access performed during the execution of the program. In particular, it is possible to detect a continuous invalid memory access that cannot be detected by the guard zone type related to the present invention. This effect is important in improving the efficiency of debugging and the validity of the test.

In the present invention, as a method of allocating the addresses to the segments, the first address allocating method and the second address allocating method are used to provide a simple method of specifying the reference segment. In addition, in the present invention, the third address allocating method is used to provide a method of specifying the reference segment capable of improving the efficiency of the memory.

In the process of allocating the addresses to the segments according to the present invention, in the first embodiment shown in FIG. 2, only the addresses allocated to the segments are changed to change the arrangement of the segments, and a program to be tested is executed to trace the memory access. However, the allocation of the addresses and the execution of the program in the first embodiment are performed in this order in the fourth embodiment in which the boundary test is performed on the memory access to the data segment arranged on the heap or in the fifth embodiment in which the boundary test is performed on the access to the data segment arranged on the stack. In these embodiments, the allocation of the addresses to the segments is performed at the time when an execution command to ensure the memory segments during the execution of the program is analyzed. That is, in the process shown in FIG. 2, Step S22 includes Step S21.

The present invention is based on a principle different from the boundary test of the FAT pointer type related to the present invention. Therefore, unlike the method related to the present invention, it is possible to correspond to an arbitrary operation of the address value, and it is possible to perform the memory access boundary test on programs in the wide range.

In the present invention, any kinds of segments may be tested as long as a program description including appropriate information is given, an appropriate trace execution environment is used, and the program is executed under a plurality of segment arrangement conditions. The present invention can be applied to any of the segments that are statically arranged, the heap segment, and the segments on the stack.

In the present invention, various methods may be used to calculate the address values plural times. For example, a method of executing the program plural times or a method of obtaining the execution result of a plurality of contexts with one test operation may be used. In addition, the present invention may be combined with a method of performing the boundary test of an executable program based on the FAT pointer type related to the present invention or method of generating a program that performs a dynamic boundary test from a C language description. As such, according to the present invention, it is possible to select an appropriate structure according to test purposes or conditions.

The present invention can be applied to source files that are described in various kinds of languages using the pointer variable, such as the C language, or executable files in which the source file is an executable format under appropriate conditions. In addition, the present invention may be applied to an object file obtained by compiling the source file. As long as a program execution environment has an appropriate function and is operated by an appropriate structure, the present invention can be applied to an actual operation environment on hardware, a simulator, an interpreter, and a method of transforming a program to generate another program for a test.

The embodiments of the present invention have been described above, but the present invention is not limited to the above-described embodiments. It will be understood by those skilled in the art that the structure or details of the present invention can be changed in various ways without departing from the scope of the present invention.

This application is based upon and claims the benefit of priority from the Japanese Patent Application No. 2007-320278 filed on Dec. 12, 2007, the entire contents of which are incorporated herein by reference.

The invention claimed is:

1. A program debugging method of debugging a memory access to memory areas which are ensured and used in a unit of segments during an execution of a program, said method comprising:

changing only addresses allocated to said segments among addresses of said memory areas to change an arrangement of said segments;

executing said program in which the arrangement of said segments is changed, tracing memory accesses involved in the execution of said program to obtain reference addresses referred to by said memory access, and obtaining at least one of execution results indicating execution results of said program, numbers of accesses indicating numbers of times said memory access is performed, and execution orders indicating orders in which a plurality of execution commands included in said program is executed;

analyzing said execution results to determine whether at least one of a plurality of execution results obtained by performing said allocating of the addresses and said executing of the program plural times, said numbers of accesses, and said execution orders are the same in all executions; and analyzing said reference addresses of a memory access to be analyzed according to an execution command, which comprises an analysis target, among a plurality of execution commands and determining whether said memory access to be analyzed is valid, when it is determined that at least one of said plurality of execution results, said numbers of accesses, and said execution orders are the same in all executions in said analyzing of the execution result.

2. The program debugging method as set forth in claim 1, wherein said program comprises one of a source file that is described in various kinds of languages including a pointer variable, an executable file in which said source file is an executable format, and an object file obtained by compiling said source file.

3. A program debugging device, including a processor, for debugging a memory access to memory areas which are ensured and used in a unit of segments during an execution of a program, the program debugging device comprising:
an address allocating unit that changes only addresses allocated to said segments among addresses of said memory areas to change an arrangement of said segments;
a program executing unit that executes said program in which the arrangement of said segments is changed, traces said memory access involved in the execution of said program to obtain reference addresses referred to by said memory access, and obtains at least one of execution results indicating execution results of said program, numbers of accesses indicating numbers of times said memory access is performed, and execution orders indicating orders in which a plurality of execution commands included in said program is executed;
an execution result analyzing unit that determines whether at least one of a plurality of execution results obtained by performing said program plural times using said address allocating unit and said program executing unit, said numbers of accesses, and said execution orders are the same in all executions; and
a memory access analyzing unit that analyzes said reference addresses of a memory access to be analyzed according to an execution command, which comprises an analysis target, among a plurality of execution commands and determines whether said memory access to be analyzed is valid, when said execution result analyzing unit determines that at least one of said plurality of execution results, said numbers of accesses, and said execution orders are the same in all executions.

4. The program debugging device as set forth in claim 3, wherein said program comprises one of a source file that is described in various kinds of languages including a pointer variable, an executable file in which said source file is an executable format, and an object file obtained by compiling said source file.

5. The program debugging device as set forth in claim 3, wherein said memory access analyzing unit includes:
a base segment specifying unit that specifies a base segment, which comprises a base for designating addresses of said memory access to be analyzed, based on said reference addresses of said memory access to be analyzed, and
wherein, when it is difficult for said base segment specifying unit to specify said base segment, it is determined that said memory access to be analyzed is invalid.

6. The program debugging device as set forth in claim 5, wherein said memory access analyzing unit includes:
a boundary test unit that determines whether said reference addresses of said memory access to be analyzed is included in said base segment specified by said base segment specifying unit,
wherein, when said boundary test unit determines that said reference addresses of said memory access to be analyzed are included in said segment, it is determined that said memory access to be analyzed is valid, and
wherein, when said boundary test unit determines that said reference addresses of said memory access to be analyzed are not included in said segment, it is determined that said memory access to be analyzed is invalid.

7. The program debugging device as set forth in claim 6, wherein, when a difference between a first reference address referred to in a first execution and a second reference address referred to in a second execution among the reference addresses of said memory access to be analyzed is equal to a difference between a first beginning address and a second beginning address allocated to a segment with a same identification number in the first execution and the second execution, said base segment specifying unit specifies said segment as said base segment.

8. The program debugging device as set forth in claim 7, wherein said address allocating unit changes the arrangement of said segments such that a difference between the beginning address of said segment before said change and the beginning address of said segment after said change is given as a constant value in said segments.

9. The program debugging device as set forth in claim 7, wherein said address allocating unit changes the arrangement of said segments such that a difference between a beginning addresses of a first segment and a second segment among said segments after said change is an integer multiple of the difference between the beginning addresses of said first segment and said second segment before said change.

10. The program debugging device as set forth in claim 7, wherein said address allocating unit changes the arrangement of said segments such that a size of a gap between said segments adjacent to each other after said change is more than that before said change by a constant value.

11. The program debugging device as set forth in claim 7, wherein said address allocating unit changes the arrangement of said segments such that a magnitude relationship between a beginning address of said segment before said change a beginning address of said segment after said change is reversed.

12. The program debugging device as set forth in claim 7, wherein said boundary test unit calculates an offset by subtracting a beginning address of said base segment from reference address of said memory access to be analyzed, and
wherein, when said offset is equal to or less than a value obtained by subtracting a number of addresses designated by reference addresses from a size of said base segment, it is determined that said reference addresses are included in said segment.

13. The program debugging device as set forth in claim 3, wherein said segments of said program are dynamically ensured on a heap.

14. The program debugging device as set forth in claim 3, wherein said segments of said program are statically arranged during the execution of said program.

15. The program debugging device as set forth in claim 3, wherein said segments of said program are arranged on a stack.

16. The program debugging device as set forth in claim 15, wherein said segment of said program is defined as a continuous memory area in which a relative address reference comprising a stack pointer as a base is allowed in one function or one function group including child functions called from said function, wherein, when said function is called during the execution of said program, a segment corresponding to said function and said stack pointer are moved to another address, and wherein, when said function returns to a call source, said segment and said stack pointer are moved to the original address.

17. The program debugging device as set forth in claim 16, wherein, when a second function or a second function group is called while a first function or a first function group is executed, a region obtained by removing an overlap region with said continuous memory area defined for said second function or said second function group from said continuous memory area defined for said first function or said first function group is a segment defined for said first function or said first function group.

18. The program debugging device as set forth in claim 3, wherein said program executing unit generates a virtual execution environment in which a plurality of stored values is stored in a register and a memory used by said program executing unit, stores in said register and said memory a plurality of stored values obtained when said program is executed based on the arrangement of said segments changed by said address allocating unit, and executes said program to calculate said reference addresses, or wherein said program executing unit generates a test program that performs a same process as that when said program is executed plural times using said virtual execution environment to obtain reference addresses and executes said test program to obtain said reference addresses.

19. The program debugging device as set forth in claim 3, wherein said program executing unit generates a virtual execution environment in which a plurality of stored values is stored in variables used in said program, stores in each variable a plurality of stored values obtained when said program is executed based on the arrangement of said segments changed by said address allocating unit, and executes said program to calculate said reference addresses, or wherein said program executing unit generates a test program that performs a same process as that when said program is executed plural times using said virtual execution environment to obtain reference addresses and executes said test program to obtain said reference addresses.

20. A program transformation device, including a processor, that transforms a program executed by a first information processing apparatus into a debugging program that allows a second information processing apparatus to perform a process of testing a memory access to memory areas which are ensured and used in a unit of segments when said program is executed by said first information processing apparatus, wherein said debugging program is stored in a computer readable memory and allows said second information processing apparatus to perform in a processor of a computer:

an address allocating process of changing only addresses allocated to said segments among addresses of said memory areas to change arrangement of said segments;

a program executing process of executing said program in which the arrangement of said segments is changed, tracing said memory access involved in the execution of said program to obtain reference addresses referred to by said memory access, and obtaining at least one of execution results indicating execution results of said program, numbers of accesses indicating numbers of times said memory access is performed, and execution orders indicating orders in which a plurality of execution commands included in said program is executed;

an execution result analyzing process of determining whether at least one of a plurality of execution results obtained by performing said address allocating process and said program executing process plural times, said numbers of accesses, and said execution orders are the same in all executions; and a memory access analyzing process of analyzing said reference addresses of a memory access to be analyzed according to an execution command, which comprises an analysis target, among a plurality of execution commands and determining whether said memory access to be analyzed is valid, when it is determined that at least one of said plurality of execution results, said numbers of accesses, and said execution orders are the same in all executions in said execution result analyzing process.

* * * * *